United States Patent
Danilov et al.

(10) Patent No.: US 11,436,203 B2
(45) Date of Patent: Sep. 6, 2022

(54) SCALING OUT GEOGRAPHICALLY DIVERSE STORAGE

(71) Applicant: EMC IP Holding Company LLC, Hopkinton, MA (US)

(72) Inventors: Mikhail Danilov, Saint Petersburg (RU); Alexander Rakulenko, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/179,486

(22) Filed: Nov. 2, 2018

(65) Prior Publication Data

US 2020/0142976 A1 May 7, 2020

(51) Int. Cl.
| | |
|---|---|
| *G06F 16/18* | (2019.01) |
| *G06F 16/182* | (2019.01) |
| *G06F 11/14* | (2006.01) |
| *G06F 16/11* | (2019.01) |
| *H04L 67/1097* | (2022.01) |
| *G06F 3/06* | (2006.01) |

(52) U.S. Cl.
CPC ......... *G06F 16/1844* (2019.01); *G06F 3/067* (2013.01); *G06F 11/1448* (2013.01); *G06F 11/1464* (2013.01); *G06F 16/113* (2019.01); *G06F 16/122* (2019.01); *H04L 67/1097* (2013.01); *G06F 2201/84* (2013.01)

(58) Field of Classification Search
CPC ............ G06F 16/1844; G06F 11/1448; G06F 11/1464; G06F 2201/84; G06F 3/067; G06F 16/113; G06F 16/122; H04L 67/1097
See application file for complete search history.

(56) References Cited

U.S. PATENT DOCUMENTS

| | | |
|---|---|---|
| 5,675,802 A | 10/1997 | Allen et al. |
| 5,805,788 A | 9/1998 | Johnson |
| 5,950,225 A | 9/1999 | Kleiman |
| 6,073,218 A | 6/2000 | DeKoning et al. |

(Continued)

OTHER PUBLICATIONS

Guo et al., "GeoScale: Providing Geo-Elasticity in Distributed Clouds" ACM 2016 (Year: 2016).*

(Continued)

*Primary Examiner* — Brittany N Allen
(74) *Attorney, Agent, or Firm* — Amin, Turocy & Watson, LLP

(57) ABSTRACT

Scaling out of a geographically diverse storage system is disclosed. A first chunk can be selected to be moved in response to scaling out of the geographically diverse storage system. In some embodiments, the first chunk can be convolved, combined, etc., with a second chunk prior to moving a representation of information comprised in the first chunk, e.g., via copy and delete operations. The moving can be in accord with a geographically diverse storage system schema and can be based on a criteria associated with the geographically diverse storage system. In an embodiment the convolved chunk can be copied to a new zone and, subsequently, the first chunk can be deleted from the old zone. In another embodiment the combined chunk can be retained at the old zone and the first chunk can be copied to the new zone prior to deleting the first chunk from the old zone.

20 Claims, 10 Drawing Sheets

(56) References Cited

U.S. PATENT DOCUMENTS

| | | | |
|---|---|---|---|
| 6,108,684 A | 8/2000 | DeKoning et al. | |
| 6,233,696 B1 | 5/2001 | Kedem | |
| 6,240,527 B1 | 5/2001 | Schneider et al. | |
| 6,502,243 B1 | 12/2002 | Thomas | |
| 6,549,921 B1 | 4/2003 | Ofek | |
| 7,007,044 B1 | 2/2006 | Rafert et al. | |
| 7,103,884 B2 | 9/2006 | Fellin et al. | |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,636,814 B1 | 12/2009 | Karr et al. | |
| 7,664,839 B1 | 2/2010 | Karr et al. | |
| 7,680,875 B1 | 3/2010 | Shopiro et al. | |
| 7,694,191 B1 | 4/2010 | Bono et al. | |
| 7,721,044 B1 | 5/2010 | Chatterjee et al. | |
| 7,653,792 B2 | 6/2010 | Shimada et al. | |
| 7,752,403 B1 | 7/2010 | Weinman, Jr. | |
| 7,895,394 B2 | 2/2011 | Nakajima et al. | |
| 8,125,406 B1 | 2/2012 | Jensen et al. | |
| 8,261,033 B1 | 9/2012 | Slik et al. | |
| 8,370,542 B2 | 2/2013 | Lu et al. | |
| 8,429,514 B1 | 4/2013 | Goel | |
| 8,479,037 B1 | 7/2013 | Chatterjee et al. | |
| 8,495,465 B1 | 7/2013 | Anholt et al. | |
| 8,504,518 B1* | 8/2013 | Ghemawat | G06F 16/1844 707/610 |
| 8,540,625 B2* | 9/2013 | Miyoshi | A61M 25/0136 600/146 |
| 8,683,205 B2 | 3/2014 | Resch et al. | |
| 8,725,986 B1 | 5/2014 | Goel | |
| 8,751,599 B2 | 6/2014 | Tran et al. | |
| 8,751,740 B1 | 6/2014 | De Forest et al. | |
| 8,751,897 B2 | 6/2014 | Borthakur et al. | |
| 8,799,746 B2 | 8/2014 | Baker et al. | |
| 8,832,234 B1 | 9/2014 | Brooker et al. | |
| 8,856,619 B1 | 10/2014 | Cypher | |
| 8,856,624 B1 | 10/2014 | Paniconi | |
| 8,892,938 B1 | 11/2014 | Sundaram et al. | |
| 8,972,478 B1 | 3/2015 | Storer et al. | |
| 9,003,086 B1 | 4/2015 | Schuller et al. | |
| 9,021,296 B1* | 4/2015 | Kiselev | G06F 3/0647 714/6.23 |
| 9,037,825 B1 | 5/2015 | Donlan et al. | |
| 9,052,942 B1 | 6/2015 | Barber et al. | |
| 9,063,838 B1 | 6/2015 | Boyle et al. | |
| 9,098,447 B1 | 8/2015 | Donlan et al. | |
| 9,128,910 B1 | 9/2015 | Dayal et al. | |
| 9,208,009 B2 | 12/2015 | Resch et al. | |
| 9,218,135 B2 | 12/2015 | Miller et al. | |
| 9,244,761 B2 | 1/2016 | Yekhanin et al. | |
| 9,268,783 B1 | 2/2016 | Shilane et al. | |
| 9,274,903 B1 | 3/2016 | Garlapati et al. | |
| 9,280,430 B2 | 3/2016 | Sarfare et al. | |
| 9,405,483 B1 | 8/2016 | Wei et al. | |
| 9,411,717 B2 | 8/2016 | Goss et al. | |
| 9,442,802 B2 | 9/2016 | Hung | |
| 9,477,682 B1 | 10/2016 | Bent et al. | |
| 9,495,241 B2 | 11/2016 | Flynn et al. | |
| 9,619,256 B1* | 4/2017 | Natanzon | G06F 11/2094 |
| 9,641,615 B1 | 5/2017 | Robins et al. | |
| 9,665,428 B2 | 5/2017 | Vairavanathan et al. | |
| 9,747,057 B1 | 8/2017 | Ramani et al. | |
| 9,817,713 B2 | 11/2017 | Gupta et al. | |
| 9,864,527 B1 | 1/2018 | Srivastav et al. | |
| 9,942,084 B1 | 4/2018 | Sorenson, III | |
| 9,971,649 B2 | 5/2018 | Dhuse et al. | |
| 10,001,947 B1 | 6/2018 | Chatterjee et al. | |
| 10,007,561 B1 | 6/2018 | Pudipeddi et al. | |
| 10,055,145 B1 | 8/2018 | Danilov et al. | |
| 10,061,668 B1 | 8/2018 | Lazier et al. | |
| 10,089,026 B1 | 10/2018 | Puhov et al. | |
| 10,097,659 B1 | 10/2018 | Rao | |
| 10,108,819 B1* | 10/2018 | Donlan | G06F 16/00 |
| 10,127,234 B1 | 11/2018 | Krishnan et al. | |
| 10,216,770 B1 | 2/2019 | Kulesza et al. | |
| 10,242,022 B1 | 3/2019 | Jain et al. | |
| 10,282,262 B2* | 5/2019 | Panara | G06F 11/2017 |
| 10,289,488 B1 | 5/2019 | Danilov et al. | |
| 10,331,516 B2 | 6/2019 | Danilov et al. | |
| 10,361,810 B2 | 7/2019 | Myung et al. | |
| 10,387,546 B1 | 8/2019 | Duran et al. | |
| 10,496,330 B1 | 12/2019 | Bernat et al. | |
| 10,503,611 B1 | 12/2019 | Srivastav et al. | |
| 10,567,009 B2 | 2/2020 | Yang et al. | |
| 10,579,490 B2 | 3/2020 | Danilov et al. | |
| 10,613,780 B1 | 4/2020 | Naeni et al. | |
| 10,628,043 B1 | 4/2020 | Chatterjee et al. | |
| 10,644,408 B2 | 5/2020 | Sakai et al. | |
| 10,671,431 B1 | 6/2020 | Dolan et al. | |
| 10,705,911 B2 | 7/2020 | Vishnumolakala et al. | |
| 10,733,053 B1* | 8/2020 | Miller | G06F 11/1088 |
| 10,740,183 B1 | 8/2020 | Blaum et al. | |
| 10,754,845 B2 | 8/2020 | Danilov et al. | |
| 10,761,931 B2 | 9/2020 | Goyal et al. | |
| 10,797,863 B2 | 10/2020 | Chen et al. | |
| 10,846,003 B2 | 11/2020 | Danilov et al. | |
| 10,951,236 B2 | 3/2021 | Chen et al. | |
| 11,023,331 B2 | 6/2021 | Danilov et al. | |
| 2002/0049883 A1 | 4/2002 | Schneider et al. | |
| 2002/0166026 A1 | 11/2002 | Ulrich et al. | |
| 2002/0191311 A1 | 12/2002 | Ulrich et al. | |
| 2003/0016596 A1 | 1/2003 | Chiquoine et al. | |
| 2005/0027938 A1 | 2/2005 | Burkey | |
| 2005/0071546 A1 | 3/2005 | Delaney et al. | |
| 2005/0080982 A1 | 4/2005 | Vasilevsky et al. | |
| 2005/0088318 A1 | 4/2005 | Liu et al. | |
| 2005/0108775 A1 | 5/2005 | Bachar et al. | |
| 2005/0140529 A1 | 6/2005 | Choi et al. | |
| 2005/0234941 A1 | 10/2005 | Watanabe | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2006/0212744 A1 | 9/2006 | Benner et al. | |
| 2006/0265211 A1 | 11/2006 | Canniff et al. | |
| 2007/0076321 A1 | 4/2007 | Takahashi et al. | |
| 2007/0239759 A1 | 10/2007 | Shen et al. | |
| 2007/0250674 A1 | 10/2007 | Findberg et al. | |
| 2008/0222480 A1 | 9/2008 | Huang et al. | |
| 2008/0222481 A1 | 9/2008 | Huang et al. | |
| 2008/0244353 A1 | 10/2008 | Dholakia et al. | |
| 2008/0320061 A1 | 12/2008 | Aszmann et al. | |
| 2009/0070771 A1 | 3/2009 | Yuyitung et al. | |
| 2009/0113034 A1 | 4/2009 | Krishnappa et al. | |
| 2009/0132543 A1 | 5/2009 | Chatley et al. | |
| 2009/0172464 A1 | 7/2009 | Byrne et al. | |
| 2009/0183056 A1 | 7/2009 | Aston | |
| 2009/0204959 A1 | 8/2009 | Anand et al. | |
| 2009/0240880 A1 | 9/2009 | Kawaguchi | |
| 2009/0259882 A1 | 10/2009 | Shellhamer | |
| 2010/0031060 A1 | 2/2010 | Chew et al. | |
| 2010/0094963 A1 | 4/2010 | Zuckerman et al. | |
| 2010/0174968 A1 | 7/2010 | Charles et al. | |
| 2010/0218037 A1 | 8/2010 | Swartz et al. | |
| 2010/0293348 A1 | 11/2010 | Ye et al. | |
| 2010/0332748 A1 | 12/2010 | Van der Goot et al. | |
| 2011/0029836 A1 | 2/2011 | Dhuse et al. | |
| 2011/0040987 A1 | 2/2011 | Augenstein et al. | |
| 2011/0066882 A1 | 3/2011 | Walls et al. | |
| 2011/0106972 A1 | 5/2011 | Grube et al. | |
| 2011/0107165 A1 | 5/2011 | Resch et al. | |
| 2011/0138148 A1 | 6/2011 | Friedman et al. | |
| 2011/0161712 A1 | 6/2011 | Athalye et al. | |
| 2011/0191536 A1 | 8/2011 | Mizuno et al. | |
| 2011/0196833 A1 | 8/2011 | Drobychev et al. | |
| 2011/0246503 A1 | 10/2011 | Bender et al. | |
| 2011/0292054 A1 | 12/2011 | Boker et al. | |
| 2012/0023291 A1 | 1/2012 | Zeng et al. | |
| 2012/0096214 A1 | 4/2012 | Lu et al. | |
| 2012/0191675 A1 | 7/2012 | Kim et al. | |
| 2012/0191901 A1 | 7/2012 | Norair | |
| 2012/0204077 A1 | 8/2012 | D'Abreu et al. | |
| 2012/0233117 A1* | 9/2012 | Holt | G06F 16/1748 707/620 |
| 2012/0311395 A1 | 12/2012 | Leggette et al. | |

(56) References Cited

U.S. PATENT DOCUMENTS

| | | |
|---|---|---|
| 2012/0317234 A1 | 12/2012 | Bohrer et al. |
| 2012/0321052 A1 | 12/2012 | Morrill et al. |
| 2013/0013564 A1 | 1/2013 | Ben-Or et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0122745 A1 | 5/2014 | Singh et al. |
| 2014/0149794 A1* | 5/2014 | Shetty ................ H04L 67/1095 714/20 |
| 2014/0164430 A1 | 6/2014 | Hadjieleftheriou et al. |
| 2014/0164694 A1 | 6/2014 | Storer |
| 2014/0172930 A1 | 6/2014 | Molaro et al. |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0304460 A1 | 10/2014 | Carlson, Jr. et al. |
| 2014/0331100 A1 | 11/2014 | Dhuse et al. |
| 2014/0351633 A1 | 11/2014 | Grube et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1* | 5/2015 | Theimer ................ G06F 16/21 707/693 |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1* | 7/2015 | Kesselman ......... G06F 16/2291 711/162 |
| 2015/0254150 A1 | 9/2015 | Gordon et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1* | 2/2016 | Patterson, III ........ G06F 3/0688 714/6.2 |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0239384 A1 | 8/2016 | Slik |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0010944 A1 | 1/2017 | Saito et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0115903 A1 | 4/2017 | Franke et al. |
| 2017/0116088 A1 | 4/2017 | Anami et al. |
| 2017/0123914 A1 | 5/2017 | Li et al. |
| 2017/0153946 A1 | 6/2017 | Baptist et al. |
| 2017/0185331 A1 | 6/2017 | Gao et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0272209 A1 | 9/2017 | Yanovsky et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1* | 10/2017 | Horowitz ............ G06F 11/3006 |
| 2017/0288701 A1 | 10/2017 | Slik et al. |
| 2017/0344285 A1 | 11/2017 | Choi et al. |
| 2018/0052744 A1* | 2/2018 | Chen ................... H04L 67/2823 |
| 2018/0063213 A1 | 3/2018 | Bevilacqua-Linn et al. |
| 2018/0074753 A1 | 3/2018 | Ober |
| 2018/0074881 A1 | 3/2018 | Burden |
| 2018/0088857 A1 | 3/2018 | Gao et al. |
| 2018/0107415 A1 | 4/2018 | Motwani et al. |
| 2018/0121286 A1 | 5/2018 | Sipos |
| 2018/0129417 A1 | 5/2018 | Sivasubramanian et al. |
| 2018/0129600 A1 | 5/2018 | Ishiyama et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0217888 A1 | 8/2018 | Colgrove et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0293017 A1 | 10/2018 | Curley |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0102103 A1 | 4/2019 | Ari et al. |
| 2019/0114223 A1 | 4/2019 | Pydipaty et al. |
| 2019/0129644 A1 | 5/2019 | Gao et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0342418 A1 | 11/2019 | Eda et al. |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0004447 A1 | 1/2020 | Danilov et al. |
| 2020/0026810 A1 | 1/2020 | Subramaniam et al. |
| 2020/0034339 A1 | 1/2020 | Gershaneck et al. |
| 2020/0034471 A1 | 1/2020 | Danilov et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117547 A1 | 4/2020 | Danilov et al. |
| 2020/0117556 A1 | 4/2020 | Zou et al. |
| 2020/0145511 A1 | 5/2020 | Gray et al. |
| 2020/0151353 A1 | 5/2020 | Struttmann |
| 2020/0204198 A1 | 6/2020 | Danilov et al. |
| 2021/0019067 A1 | 1/2021 | Miller et al. |
| 2021/0019093 A1 | 1/2021 | Karr et al. |

(56) References Cited

U.S. PATENT DOCUMENTS

| | | |
|---|---|---|
| 2021/0019237 A1 | 1/2021 | Karr et al. |
| 2021/0034268 A1 | 2/2021 | Hara et al. |
| 2021/0096754 A1 | 4/2021 | Danilov et al. |
| 2021/0132851 A1 | 5/2021 | Danilov et al. |
| 2021/0133049 A1 | 5/2021 | Danilov et al. |
| 2021/0218420 A1 | 7/2021 | Danilov et al. |
| 2021/0255791 A1 | 8/2021 | Shimada et al. |
| 2021/0273660 A1 | 9/2021 | Danilov et al. |

OTHER PUBLICATIONS

Guo et al., "Providing Geo-Elasticity in Geographically Distributed Clouds". ACM 2018 (Year: 2018).*
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance dated May 4, 2020 for U.S. Appl. No. 16/240,193, 46 pages.
Office Action dated May 11, 2020 for U.S. Appl. No. 16/177,278, 53 pages.
Office Action dated May 8, 2020 for U.S. Appl. No. 16/231,018, 78 pages.
Notice of Allowance dated May 11, 2020 for U.S. Appl. No. 16/240,193, 24 pages.
Office Action dated Nov. 16, 2018 for U.S. Appl. No. 15/662,273, 19 pages.
Non-Final Office Action received for U.S. Appl. No. 15/651,504 dated Mar. 21, 2019, 10 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6", URL: https://en.wikipedia.org/wiki/Standard_RAID_levels#RAID_6, Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Office Action dated Jan. 9, 2020 for U.S. Appl. No. 16/010,255, 31 pages.
Office Action dated Feb. 5, 2020 for U.S. Appl. No. 16/261,551, 30 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/209,185 dated Jun. 18, 2020, 22 pages.
Martin Hosken, Developing a Hyper-Converged Storage Strategy for VMware vCloud Director with VMware vSAN, Jan. 2018 (Year: 2018).
Non-Final Office Action received for U.S. Appl. No. 16/261,549 dated Apr. 15, 2020, 22 pages.
Non-Final Office Action received for U.S. Appl. No. 16/374,726 dated Jun. 2, 2020, 47 pages.
Natarajan, RAID 0, RAID 1, RAID 5, RAID 10 Explained with Diagrams, Aug. 10, 2010, thegeekstuff.com (18 pages).
Non-Final Office Action received for U.S. Appl. No. 16/177,285 dated Jul. 22, 2020, 31 pages.
Non-Final Office Action received for U.S. Appl. No. 16/261,547 dated Sep. 3, 2020, 26 pages.
Non-Final Office Action received for U.S. Appl. No. 16/261,548 dated Aug. 21, 2020, 42 pages.
Notice of Allowance received for U.S. Appl. No. 16/261,549 dated Jul. 17, 2020, 40 pages.
Qiang et al., "Dynamics Process of Long-running Allocation/Collection in Linear Storage Space", International Conference on Networking, Architecture, and Storage (NAS 2007), Guilin, 2007, pp. 209-216.
Non-Final Office Action received for U.S. Appl. No. 16/374,725 dated Aug. 19, 2020, 50 pages.
Non-Final Office Action received for U.S. Appl. No. 16/511,161 dated Jul. 10, 2020, 24 pages.
Notice of Allowance received for U.S. Appl. No. 15/862,547 dated Mar. 29, 2019 27 pages.
Non-Final Office Action received for U.S. Appl. No. 15/792,714 dated Apr. 4, 2019, 20 pages.
Final Office Action received for U.S. Appl. No. 15/792,714 dated Sep. 12, 2019, 43 pages.
Wikipedia "Garbage Collection", URL: https://en.wikipedia.org/wiki/Garbage_collection_(computer science)#Availability (Year: 2017) retrieved using the WayBackMachine, Sep. 8, 2017, 8 pages.
Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.
Wikipedia "Front and back ends" URL: https://en.wikipedia.org/wiki/Front_and_back_ends (Year:2019), Sep. 6, 2019, 4 pages.

(56) References Cited

OTHER PUBLICATIONS

Notice of Allowance received for U.S. Appl. No. 15/792,714 dated Nov. 8, 2019, 31 pages.
Non-Final Office Action received for U.S. Appl. No. 15/791,390 dated Sep. 20, 2019, 27 pages.
Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/254,073, dated Aug. 18, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Non-Final Office Action received for U.S. Appl. No. 16/670,746 dated Feb. 16, 2021, 55 pages.
Dell Technologies, "ECS Overview and Architecture", h14071.18, Feb. 2021, 55 Pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.

Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Non-Final Office Action received for U.S. Appl. No. 16/584,800 dated Mar. 3, 2022, 90 pages.
Non-Final Office Action received for U.S. Appl. No. 16/403,417 dated Feb. 25, 2022, 100 pages.
Non-Final Office Action received for U.S. Appl. No. 17/153,602 dated Mar. 16, 2022, 40 pages.
Notice of Allowance received for U.S. Appl. No. 17/333,793 dated Mar. 9, 2022, 39 pages.
Sun et al., "Data Management across Geographically-Distributed Autonomous Systems: Architecture, Implementation, and Performance Evaluation," IEEE Transactions on Industrial Informatics, 2019, 9 pages.
Notice of Allowance dated May 16, 2022 for U.S. Appl. No. 16/526,182, 54 pages.
Notice of Allowance received for U.S. Appl. No. 16/570,657 dated Sep. 7, 2021, 65 pages.
Ma et al., "An Ensemble of Replication and Erasure Codes for Cloud File Systems", Proceedings—IEEE INFOCOM, Apr. 2013, pp. 1276-1284.
Final Office Action received for U.S. Appl. No. 16/698,096 dated Sep. 7, 2021, 24 pages.
Final Office Action received for U.S. Appl. No. 16/177,285 dated Sep. 14, 2021, 65 pages.
Final Office Action received for U.S. Appl. No. 16/670,715 dated Sep. 7, 2021, 35 pages.
Notice of Allowance dated Sep. 10, 2021 for U.S. Appl. No. 16/745,855, 30 pages.
Office Action dated Nov. 24, 2021 for U.S. Appl. No. 16/526,182, 83 pages.
Notice of Allowance dated Nov. 22, 2021 for U.S. Appl. No. 16/888,144, 71 pages.
Office Action dated Apr. 13, 2021 for U.S. Appl. No. 16/781,316, 21 pages.
Non-Final Office Action received for U.S. Appl. No. 16/670,715 dated Jan. 5, 2022, 22 pages.
Non-Final Office Action received for U.S. Appl. No. 16/834,649 dated Jan. 28, 2022, 26 pages.
Office Action dated Feb. 8, 2022 for U.S. Appl. No. 16/986,222, 62 pages.
Office Action dated Nov. 24, 2021 for U.S. Appl. No. 16/538,984, 30 pages.
Non-Final Office Action received for U.S. Appl. No. 16/698,096 dated Jan. 5, 2022, 21 pages.
Notice of Allowance dated Jun. 27, 2022 for U.S. Appl. No. 16/584,800, 33 pages.
Office Action dated Jun. 17, 2022 for U.S. Appl. No. 16/986,222, 76 pages.
Office Action dated Jul. 14, 2022 for U.S. Appl. No. 17/153,602, 34 pages.
Office Action dated Jun. 1, 2022 for U.S. Appl. No. 16/538,984, 114 pages.
Notice of Allowance dated Jun. 27, 2022 for U.S. Appl. No. 17/333,815, 10 pages.

* cited by examiner

SCALING OUT GEOGRAPHICALLY DIVERSE STORAGE

TECHNICAL FIELD

The disclosed subject matter relates to data convolution, more particularly, to addition of a storage zone to geographically diverse storage zones.

BACKGROUND

Conventional data storage techniques can employ convolution and deconvolution of data to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage.

DETAILED DESCRIPTION

Figure 1:
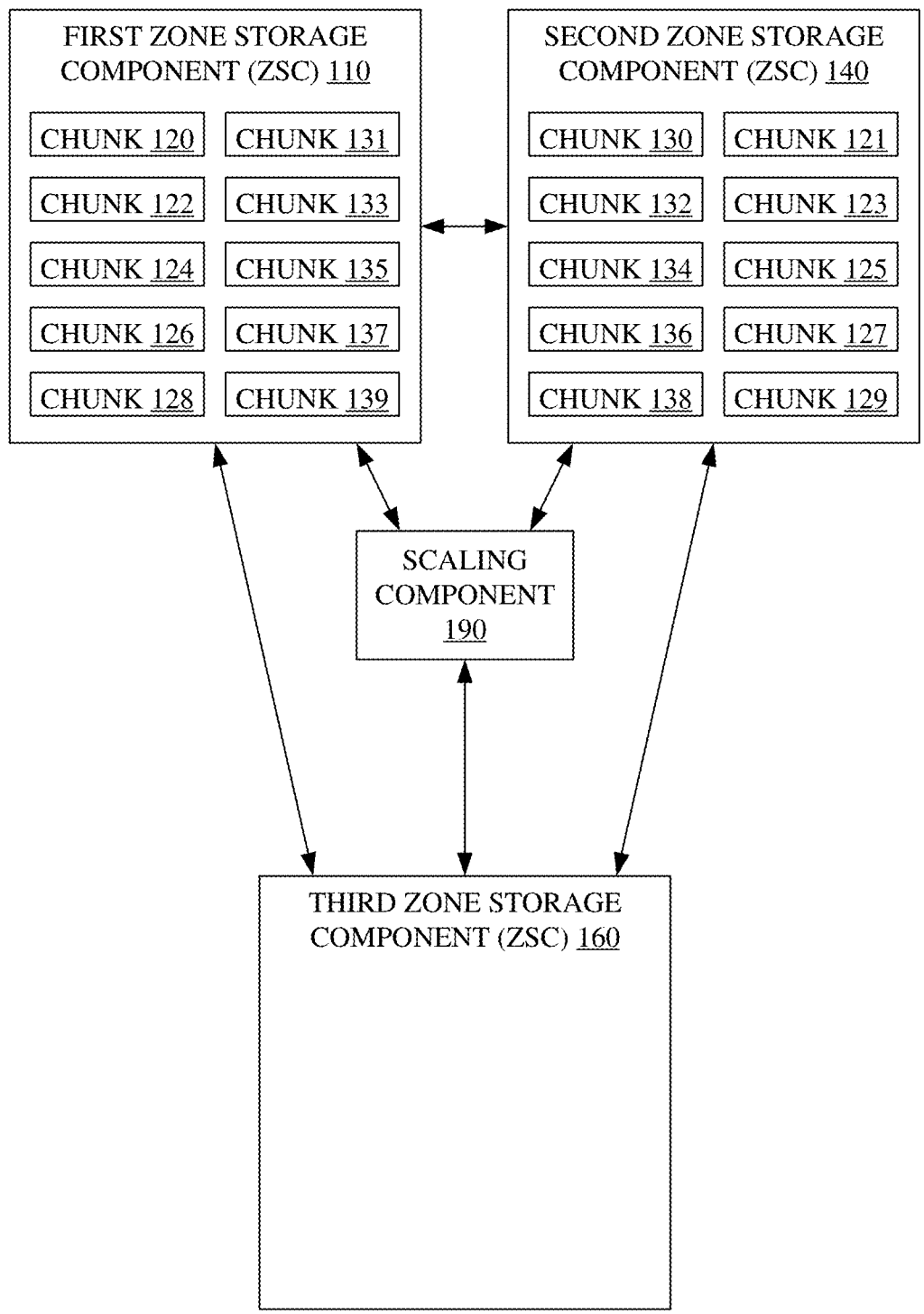
FIG. 1 is an illustration of an example system that can facilitate addition of a storage zone to geographically diverse storage zones of a geographically diverse storage construct, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. As an example, convolution can allow data to be packed or hashed in a manner that uses less space that the original data. Moreover, convolved data, e.g., a convolution of first data and second data, etc., can typically be de-convolved to the original first data and second data. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as chunks, for example a 128 MB chunk, etc. Chunks can be used to store user data, and the chunks can be shared among the same or different users, for example, one chunk may contain fragments of objects from several users. A chunk's content can generally be modified in an append-only mode to prevent overwriting of data already added to the chunk. As such, when a typical chunk becomes full enough, it can be sealed so that the data therein is generally not able for further modification. These chunks can be then stored in a geographically diverse manner to allow for recovery of the data, such as if a first copy of the data is destroyed, e.g., disaster recovery, etc. Blocks of data, hereinafter 'data chunks', or simply 'chunks', can be used to store user data. Chunks from a data storage device, e.g., 'zone storage component' (ZSC), 'zone storage device' (ZSD), etc., located in a first geographic location/area/region, hereinafter a 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device.

Geographically diverse data storage can use data compression to store data. As an example, a storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an exclusive-or operation, hereinafter 'XOR', into a different chunk to allow recovery of the Seattle or San Jose data from the convolved chunk, but where the convolved chunk typically consumes less storage space than the sum of the storage space for both the Seattle and San Jose chunks individually. In an aspect, compression can comprise convolving data and decompression can comprise deconvolving data, hereinafter the terms compress, compression, convolve, convolving, etc., can be employed interchangeably unless explicitly or implicitly contraindicated, and similarly, decompress, decompression, deconvolve, deconvolving, etc., can be used interchangeably. Compression, therefore, can allow original data to be recovered from a compressed chunk that consumes less storage space than storage of corresponding uncompressed data chunks. This can be beneficial in that data from a location can be backed up by redundant data in another location via a compressed chunk, wherein a redundant data chunk can be smaller than the sum of the data chunks contributing to the compressed chunk. As such, can be compressed via a convolution technique to reduce the amount of storage space used at a geographically distinct location.

A convolved chunk stored at a geographically diverse storage device, e.g., ZSC, ZSD, in a zone, etc., can comprise data from some or all storage devices of a geographically diverse storage system. As an example, where there are five storage devices corresponding to different storage zones of the geographically diverse storage system, a first zone can comprise unconvolved or convolved chunks from the other four storage devices to create a 'backup' of the data from the other four storage devices, albeit the convolved chunks can consume less storage space than the unconvolved chunks. In this example, the first storage device can, in an embodiment, create a backup chunk from chunks received from the other four storage devices. In an aspect, this can result in generating copies of the four received chunks at the first storage device and, in some embodiments, then convolving the four chunks to generate a fifth chunk that is a backup of the other four chunks. Moreover, one or more other copies of the four chunks and/or the fifth chunk can be created at the first storage device for redundancy. In another example, the first storage device can convolve chunks from three of the other four storage devices, etc.

In an embodiment of the disclosed subject matter, a first data chunk and a second data chunk corresponding to a first and second zone that are geographically diverse can be stored in a third data chunk stored at third zone that is geographically diverse from the first and second zones. In an aspect the third chunk can represent the data of the first and second data chunks in a compressed form, e.g., the data of the first data chunk and the second data chunk can be convolved, such as by an XOR function, into the third data chunk. In some embodiments, convolved chunks can be further convolved with other chunks and/or other convolved chunks to yield a further convolved chunk, e.g., chunk A can be convolved with chunk B to yield chunk AB, which can be convolved with chunk C to yield chunk ABC, which can be convolved with chunk DEF to yield chunk ABCDEF, etc. In an embodiment, first data of the first data chunk and second data of the second data chunk can be convolved with or without replicating the entire first data chunk and the entire second data chunk at data store(s) of the third zone, e.g., as at least a portion of the first data chunk and at least a portion of the second data chunk are received at the third zone, they can be convolved to form at least a portion of the third data chunk. In an aspect, where compression occurs without replicating a chunk at another zone prior to compression, this can be termed as 'on-arrival data compression' and can reduce the count of replicate data made at the third zone and data transfers events can correspondingly also be reduced. In an aspect, a ZSC can comprise one or more data storage components that can be communicatively coupled, e.g., a ZSC can comprise one data store, two or more communicatively coupled data stores, etc. In an aspect, this can allow replication of data in the ZSC and can provide data redundancy in the ZSC, for example, providing protection against loss of one or more data stores of a ZSC. As an example, a ZSC can comprise multiple hard drives and a chunk can be stored on more than one hard drive such that, if a hard drive fails, other hard drives of the ZSC can comprise the chunk, or a replicate of the chunk.

In an aspect, as data in chunks becomes stale, old, redundant, etc., it can be desirable to delete these chunks to free storage space for other uses. In an aspect, a convolved chunk can be de-convolved, partially or completely, to yield other chunks, e.g., the other chunks can represent the same data as the convolved chunk, but the other chunks can typically consume more storage space that the convolved chunk because these other chunks are 'less highly convolved'. As an example, the chunk (AB(CD)), which can be chunk A convolved with Chunk B convolved with a chunk that itself is a convolution of chunks C and D, can be deconvolved into chunks A to D, into chunks A, B, and (CD), into chunks A and B(CD), etc. Moreover, in this example, because the convolution can be commutative, such as where an XOR function is used to convolve/deconvolve the data, the chunk (AB(CD)) can be deconvolved into, for example, chunks B and A(CD), chunks A, D, and (BC), etc. Where a chunk is to be deleted in a remote zone, the deconvolution can comprise transfer of other chunks to facilitate the deconvolution. As an example, where the chunk (AB(CD)) is at a first zone, and chunk D is to be deleted, data for one or more of chunks A, B, and C, can be replicated in the first zone from other zones to facilitate deconvolution, e.g., (AB(CD) XOR (ABC), where data for one or more of chunks A, B, and C, is replicated into the first zone, and can result in chunks (ABC) and D, such that chunk D can be deleted and leave just chunk (ABC) at the first zone. As such, it can be desirable to reduce the resource consumption in replicating chunks between zones to facilitate the deletion of a chunk from a convolved chunk. As an example, it can consume less bandwidth to replicate Chunk (ABC) from a second zone to the example first zone as compared to replicating each of Chunk A, Chunk B, and Chunk C from the second zone to the first zone. This can be accommodated, for example, by first, in the second zone, generating a compressed chunk (ABC), such as from chunks A, B, and C, from chunk AB and chunk C, from chunk AC and chunk B, etc., prior to replicating generated chunk ABC into the first zone.

In an aspect, compression/convolution of chunks can be performed by different compression/convolution technologies. Logical operations can be applied to chunk data to allow compressed data to be recoverable, e.g., by reversing the logical operations to revert to an earlier form of chunk data. As an example, data from chunk 1 can undergo an exclusive-or operation, hereinafter 'XOR', with data from chunk 2 to form chunk 3. This example can be reversed by XORing chunk 3 with chunk 2 to generate chunk 1, etc. While other logical and/or mathematical operations can be employed in compression of chunks, those particular operation details are generally beyond the scope of the presently disclosed subject matter and, for clarity and brevity, only the XOR operator will be illustrated herein, however, it is noted that the disclosure is not so limited to just XOR operations and that those other operations or combinations of operations can be substituted without departing from the scope of the present disclosure. As such, all logical and/or mathematical operations for compression germane to the disclosed subject matter are to be considered within the scope of the present disclosure even where not explicitly recited for the sake of clarity and brevity.

In an aspect, the presently disclosed subject matter can, as mentioned, include 'zones'. A zone can correspond to a geographic location or region. As such, different zones, e.g., where a zone can connote a group of ZSCs or ZSDs in a geographic area, etc., can be associated with different geographic locations or regions. As an example, Zone A can comprise Seattle, Wash., Zone B can comprise Dallas, Tex., and, Zone C can comprise Boston, Mass. In this example, where a local chunk from Zone A is replicated, e.g., compressed or uncompressed, in Zone C, an earthquake in Seattle can be less likely to damage the replicated data in Boston. Moreover, a local chunk from Dallas can be convolved with the local Seattle chunk, which can result in a compressed/convolved chunk, e.g., a partial or complete chunk, which can be stored in Boston. As such, either the local chunk from Seattle or Dallas can be used to deconvolve the partial/complete chunk stored in Boston to recover the full set of both the Seattle and Dallas local data chunks. The convolved Boston chunk can consume less disk space than the sum of the separate Seattle and Dallas local chunks. An example technique can be "exclusive or" convolution, hereinafter 'XOR', '⊕', etc., where the data in the Seattle and Dallas local chunks can be convolved by XOR processes to form the Boston chunk, e.g., $C=A1 \oplus B1$, where A1 is a replica of the Seattle local chunk, B1 is a replica of the Dallas local chunk, and C is the convolution of A1 and B1. Of further note, the disclosed subject matter can be employed in more or fewer zones, in zones that are the same or different than other zones, in zones that are more or less geographically diverse, etc. As an example, the disclosed subject matter can be applied to data of a single disk, a memory, a drive, a data storage device, etc., without departing from the scope of the disclosure, e.g., the zones can represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami local chunk, E, C1 is a replica of the Boston partial chunk, C, e.g., a convolved chunk, from the previous example, such that D is an XOR of C1 and E1 and can be, for example, located in Fargo.

In an aspect, XORs of data chunks in disparate geographic locations can provide for de-convolution of the XOR data chunk to regenerate the input data chunk data. Continuing a previous example, the Fargo chunk, D, can be de-convolved into C1 and E1 based on either C1 or D1; the Miami chunk, C, can be de-convolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, de-convolution can rely on retransmitting a replica chunk that so that it can be employed in de-convoluting the convolved chunk. As an example, the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to de-convolve C. As an example, where the Seattle chunk, A, is corrupted, the data can be recovered from C by deconvolving C with a replica of the Dallas chunk B. As such, B can be replicated by copying B from Dallas to Boston as B1, then de-convolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to de-convolve C with after A has been deleted. As such, it can be desirable to de-convolve C into A1 and B1 prior to deleting A and A1, such that B1 can be convolved with another chunk, for example Miami chunk, E. As such, recovery of B1 can be based on E1 and the XOR of B1E1. Also, of note, to de-convolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be de-convolved.

In an aspect, a geographically diverse storage construct allows for addition or removal of zones, ZSCs, ZSDs, etc., to/from the construct. As an example, a new zone can be added to a geographically diverse storage system. As another example, a zone can be split into two or more zones by adding other zone storage devices and redefining the extents of corresponding zones, such as splitting a Washington state zone, having ZSCs in the Seattle area, into an Eastern zone and a Western zone by adding ZSCs to the Spokane area and directing storage accordingly. Adding a new zone can comprise adding ZSCs, ZSDs, etc., that represent an 'empty' zone, which can indicate that the storage device(s) of the ZSC, etc., does not yet store data for the zone or other zones of the geographically diverse storage construct.

In an embodiment, it can be desirable to redistribute stored data from some zone(s) into other zone(s) in conjunction with adding a zone, ZSC, etc., to a geographically diverse storage construct. For simplicity and clarity, a new ZSC, as discussed herein, will be treated as an empty zone. However, in some embodiments, a new ZSC can be a non-empty ZSC, e.g., comprising storage device(s) that already comprise stored chunk(s), and all such embodiments are within the scope of the present disclosure even where not explicitly recited for the sake of clarity and brevity. Where a new ZSC is added to a geographically diverse storage construct, some data from other zones can be moved to the new ZSC. In an aspect, this can be to redistribute data chunks to provide better geographic diversity. In another aspect, this can be to alter available storage space on ZSCs of the geographically diverse storage construct. In still another aspect, this can be to utilize data store(s) having different attributes, e.g., monetary cost, energy consumption, space or size of the physical storage device(s), reliability of storage device(s), etc. To enable adding of a new zone, ZSC, ZSD, etc., e.g., 'scaling out' a geographically diverse storage construct, a scaling component can utilize information about the geographically diverse storage construct, the new ZSC, etc., network information, supplemental data, etc., to facilitate the scaling out of the geographically diverse storage construct.

In an embodiment, a scaling component can be communicatively coupled to components of the geographically diverse storage construct, e.g., to ZSC(s), etc., and can be employed to determine data redistribution information. As an example, where a new ZSC is added, a scaling component can rank moving data chunks from a nearly full ZSC to the new ZSC to allow more usable space on the nearly full ZSC. As another example, a scaling component can rank moving data to the new ZSC from a ZSC having more expensive storage costs per unit data higher than moving data from a ZSC having less expensive storage costs, wherein storage costs can be monetary costs, such as equipment prices, dollars per unit energy, land/building costs, etc., or non-momentary costs, such as, energy consumption levels, environmental impacts, man hours of maintenance, availability of services/utilities/skilled workers, etc.

Data from a first ZSC can be moved to a newly added ZSC. In an aspect, data can be moved from several ZSCs to one or more newly added ZSCs. Moreover, the movement of data can comport with geographically diverse data storage techniques, e.g., moving data can result in data storage that comports with geographic diversity of the stored data. As an example, in an embodiment, this can comprise moving a primary backup chunk and a secondary backup chunk so that they end up in different zones to maintain protection of the backed up data. Similar considerations can be afforded other backups of the primary backup chunk, e.g., 3rd, 4th, etc., backup chunks replicating the primary backup chunk, can be moved to retain geographic diversity.

In an aspect, moving data between zones can comprise copying a primary chunk to a new zone and then deleting the primary chunk at the originating zone, thereby effectively "moving" the copy of the primary at the new zone. In some embodiments, moving can be accomplished bit-by-bit, e.g., a bit is copied and then the original bit is deleted, in effect moving the chunk at the bit level. In other embodiments, moving can be accomplished chunk by chunk, e.g., a whole chuck is copied before the original chunk is deleted. In still other embodiments, other groups of data can be moved via the copy and delete technique, e.g., an entire storage device can be copied before the original is deleted, etc.

As will be appreciated, moving data to a new zone can be network intensive because the data being moved would typically be static in the corresponding resident zone and consume minimal, if any, inter-zone network resources, in contrast to large scale copying of data from one zone to another. Additionally, where a new zone receives the moved data, the writing of that data can be processor intensive and increases where the new zone can receive data from one or more zones all trying to distribute data to the new zone. In an aspect, a scaling component can regulate data transfers by indicating when any zone can move data to another zone. In an aspect this can schedule data movement to a newly added zone to moderate network use, etc. As an example, data movement can be scheduled to historically slow network use periods, e.g., late at night, on weekends, over holidays, etc. In a further aspect, this can schedule data movement to a newly added zone to moderate processor use, etc. As an example, data movement can be scheduled to allow data influx from a limited number of zones, e.g., one other zone at a time, etc. In this example, where two zones are to move data into a newly added third zone, the data movement can be scheduled to moderate processor use at the third zone by, for example, scheduling data to move from the first zone before moving data from the second zone, to interleave data movement so that some data is moved from the first zone then some data form the second zone, then some more data from the first zone, then some more data form the second zone, etc.

Additionally, originating zones, e.g., zones moving data towards a newly added zone, etc., can perform operations to combine data before moving to alter network usage, processor usage at the new zone, etc. In an aspect, if a first zone is to move data from two chunks to a new zone, the two chunks can be combined, e.g., convolved, etc., as disclosed herein, to consume less storage space prior to moving and, correspondingly, the movement of a combined chunk can consume less network resources and less new zone processor resources in the movement of the combined chunk. The scaling component can indicate which chunks can be combined so as to coordinate data chunk movement to preserve data integrity in the geographically diverse storage construct. As an example, a moving a primary chunk and a secondary chunk in a combined chunk, e.g., the data of the primary and the secondary are combined in the combined chunk, from a first zone to a new zone can be coordinated with moving corresponding chunks from a second zone so that the integrity of the geographically diverse data storage scheme is preserved, e.g., it is generally undesirable to allow combining and/or moving data chunks where it results in data redundancy transitioning a threshold level of redundancy and/or geographic diversity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate addition of a storage zone to geographically diverse storage zones employing alternative chunk compression processes, in accordance with aspects of the subject disclosure. System 100 can comprise first zone storage component (ZSC) 110 that can store data in accord with a geographically diverse storage construct. In an embodiment, ZSC 110 can store data chunks 120-128, etc. In an embodiment, data chunks 120-128, etc., can be primary data chunks. In an aspect, a primary data chunk can be a primary copy of data, e.g., a chunk of data of the same zone, a chunk of data from another zone, etc. As an example, data generated in Seattle can be backed up in a primary data chunk in a Seattle zone ZSC, in a Dallas zone ZSC, etc. In an aspect, the primary data chunk is itself a backup of customer data. A primary chunk can be backed up by a secondary data chunk that represents the data of the primary chunk. As an example, a secondary chunk can be a copy of the primary chunk. As another example, a secondary chunk can be a combined chunk allowing recreation of the primary chunk data, e.g., via deconvolution, etc., as disclosed elsewhere herein. In an aspect, the secondary chunk can be stored on the same or different zone, although generally, for geographic diversity, the secondary chunk would typically be stored on another zone. Accordingly, first ZSC 110, in an embodiment, can store data chunks 131-139, etc. In an embodiment, data chunks 131-139, etc., can be secondary data chunks, e.g., as geographically diverse representations of data stored in other primary chunks, e.g., chunks 130-138, etc., of second ZSC 140, etc.

Similarly, second ZSC 140 can store chunks 130-138, and 121-129, etc. In an embodiment, chunks 130-138, etc., can be primary chunks that correspond to the earlier example secondary chunks 131-139, etc., of first ZSC 110. Further, in some embodiments, chunks 121-129, etc., can be secondary chunks corresponding to the example primary chunks 120-128, etc., of first ZSC 110. As such, as an example, first ZSC 110 can have primary chunks 120-128 that are protected by secondary chunks 121-129 on second ZSC 140. Correspondingly in the example, second ZSC 140 can have primary chunks 130-138 that are protected by secondary chunks 131-139 on first ZSC 110.

System 100 can comprise scaling component 190 that can be communicatively coupled to first ZSC 110 and second ZSC 140. Scaling component 190 can determine which chunks to move to preserve a threshold level of data redundancy, a threshold level of geographic diversity, a threshold level of network resource consumption, monetary cost, processor resource consumption, etc. In an aspect, scaling component 190 can provide information, or an indication, related to adding a new zone, ZSC, ZSD, etc. As an example, where geographic diversity in a two zone system is determined to satisfy a diversity rule, scaling component 190 can indicate that third ZSC 160 should be added. In some embodiments, third ZSC 160 can be a dormant zone, e.g., a zone that is comprised in the geographically diverse storage construct but goes unused, is less used, etc., and that can be activated, brought into use, used more, etc., for example, in response to a determination by scaling component 190, etc. In an embodiment, scaling component 190 can be located separate from a ZSC, e.g., ZSC 110, 140, 160, etc. In an embodiment, scaling component 190 can be located remotely from a ZSC, e.g., ZSC 110, 140, 160, etc., e.g., both separate from, and located far from, a ZSC. In an embodiment, scaling component 190 can be comprised in a ZSC, e.g., ZSC 110, 140, 160, etc., e.g., scaling component 190 can be part of one or more of the ZSC of the geographically diverse storage system. In an embodiment, scaling component 190 can be comprised more than one ZSC, e.g., scaling component 190 can be a distributed component comprised in more than one ZSC of the geographically diverse storage system.

As is illustrated in system 100, third ZSC 160 can be an empty ZSC that can be available to move data from one or more of first ZSC 110, second ZSC 140, etc. In an aspect, the movement of data chunks into third ZSC 160 can result from determinations at scaling component 190. In an embodiment, scaling component 190 can schedule movement of one or more chunks from first ZSC 110, and/or one or more chunks from second ZSC 140, into third ZSC 160 in a manner that comports with the geographically diverse storage construct, satisfies cost/resource rules, etc. As an example, scaling component 190 can indicate that all data transfers can occur in low network usage periods, that chunks 120 and 121, e.g., a primary chunk and a corresponding secondary chunk, are not both moved to third ZSC 160 because it would limit geographic diversity, and that first ZSC 110 moves data at a different time than second ZSC 140 to reduce processor loading at third ZSC 160. Numerous other examples of scaling component 190 coordinating data movement will be readily appreciated and are all considered within the scope of the instant disclosure even where not expressly recited for the sake of clarity and brevity.

Figure 2:
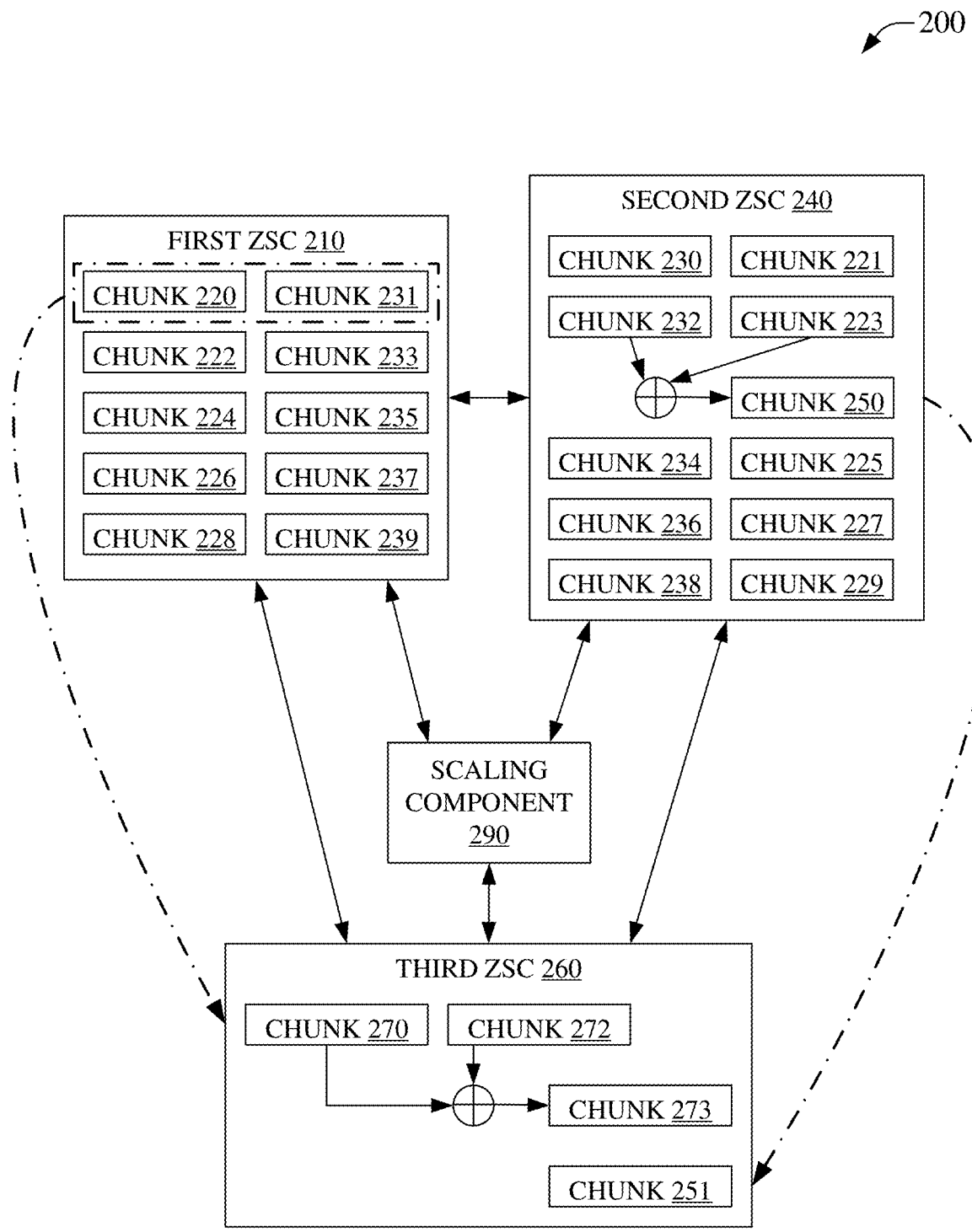
FIG. 2 is an illustration of an example system that can facilitate addition of a storage zone to geographically diverse storage zones employing alternative chunk compression processes, in accordance with aspects of the subject disclosure.

FIG. 2 is an illustration of a system 200, which can facilitate addition of a storage zone to geographically diverse storage zones employing alternative chunk compression processes, in accordance with aspects of the subject disclosure. System 200 can comprise first zone storage component (ZSC) 210, second ZSC 240, third ZSC 260, etc. The ZSCs can store data chunks, e.g., chunks 220-228, 230-238, 231-239, 221-229, etc. These chunks can be primary chunks, secondary chunks, etc. In an aspect, these chunks can be combined chunks, e.g., chunk 250, 273, etc. In an aspect, these chunks can be replicates of chunks, e.g., chunk 251 replicating chunk 250, etc. In an aspect, these chunks can be chunks comprising data representing data of other chunks, e.g., as backup chunks, such as secondary chunks backing up primary chunks, etc., or combined chunks having data representing other chunks, e.g., chunk 250 comprising data representing information from chunks 232, 223, etc., chunk 273 comprising data representing information from chunk 270, 272, etc., chunk 251 comprising data representing information from chunk 250, etc.

Scaling component 290 can communicate with one or more of the ZSCs to orchestrate moving data between chunks of a geographically diverse storage system. In an embodiment, scaling component 290 can initiate copying chunks from a ZSC, e.g., first ZSC 210, etc., to another ZSC, e.g., third ZSC 260, etc. As an example, scaling component 290 can cause chunk 220 to be copied, as chunk 270, from first ZSC 210 into third ZSC 260. As another example, scaling component 290 can cause chunk 231 to be copied, as chunk 271, from first ZSC 210 into third ZSC 260. Scaling component 290 can further inform a ZSC, e.g., first ZSC 210, etc., that the copy has been performed. In an aspect, this can comprise informing based on a validated or unvalidated completion of the copying between ZSCs. Moreover, the ZSCs, in response to notification of the completion of the copying can perform other actions, e.g., deleting a local chunk that has been copied into another zone, etc. As an example, in response to copying chunk 220, as chunk 270, into third ZSC 260 from first ZSC 210, scaling component 290 can notify first ZSC 210 that the copy is complete and first ZSC 210 can then delete chunk 210. In some embodiments, scaling component 290 can initiate these other actions, e.g., scaling component 290 can initiate deletion of the example chunk 220 in response to the copying of chunk 220 into third ZSC 260 as chunk 270. As such, scaling component 290 can inform of the completion of the copying to allow ZSCs to perform other actions, can itself initiate these other actions, etc.

As is illustrated in system 200, scaling component 290 can orchestrate moving of one or more chunks, e.g., via copying and subsequent other action(s), etc., such as moving chunks 220 and 231, as chunks 270 and 272, from first ZSC 210 into third ZSC 260. In an aspect, this can correspond to adding third ZSC 260 to a geographically diverse storage system comprising first ZSC 210, etc. As an example, where third ZSC 260 is added, scaling component 290 can determine that chunks 220 and 231 are to be moved into the newly added third ZSC 260. This determination can be based on criteria as disclosed elsewhere herein, e.g., cost, load balancing, network usage, reliability, geographic diversity, data redundancy, etc. In this example, chunks 270 and 272 can replicate information of chunks 220 and 231. Subsequently, chunks 220 and 231 can be deleted where their information is now represented in chunks 270 and 272. Third ZSC can then cause chunks to be combined, or can be instructed, such as via scaling component 290, to combine chunks. As an example, third ZSC 260 can be instructed by scaling component 290 to convolve chunks 270 and 272 into chunk 273. As another example, third ZSC 260 can self-initiate convolving chunks 270 and 272 into chunk 273. Subsequently, where chunk 273 comprises a representation of the information from chunks 270 and 272, e.g., in a convolved state, chunks 270 and 272 can be deleted. In an aspect, storing chunk 273 can consume less storage space that storing each of chunks 270 and 272. It is noted that this technique of moving chunks comprises network resource usage for moving two chunks, e.g., copying chunks 220 and 231 from first ZSC 210 to third ZSC 260.

In some embodiments, network resource consumption can be improved by allowing an originating ZSC to first combine chunks prior to copying into a new ZSC. As an example, second ZSC 240 can copy chunks 232 and 223 to third ZSC 260 as chunk 251. In this example, second ZSC 240 can be instructed to, or can self-initiate, combining chunks 232 and 223 into chunk 250 before copying chunk 250 into third ZSC 260 as chunk 251. In an aspect, second ZSC 240 can self-initiate convolving the subject chunks in response to being instructed to move the subject chunks to a new ZSC, e.g., in response to an instruction from scaling component 290 to move chunks 232 and 223, second ZSC 240 can self-initiate combining them prior to moving. In another aspect, second ZSC can receive an instruction, e.g., from scaling component 290, to combine chunks 232 and 223 before moving to third ZSC 260. It is noted that moving chunk 250, which comprises information representing the data of chunk 232 and chunk 223, into third ZSC 260 comprises network resource usage for moving one chunk of data. In an aspect, this can reduce network resource usage in comparison to moving two separate chunks, such as moving chunk 220 and chunk 231 from first ZSC 210 to third ZSC 260 before combining into chunk 273 at third ZSC 260. In an additional aspect, by first combining chunks at second ZSC 240, third ZSC 260 processor usage is also reduced in comparison to moving separate chunks before combining. System 200 illustrates, in an aspect, that some embodiments of the disclosed subject matter can mix the first technique of 'move then combine' with the second technique of 'combine then move'.

In an embodiment, scaling component 290 can determine which technique to apply to one or more chunks movements in regard to the disclosed subject matter. In an example, scaling component 290 can determine that there is adequate network resources and that third ZSC 260 has a less burdened processor than first ZSC 210 and, accordingly, can instruct first ZSC 210 to copy chunks 220 and 231 to third ZSC 260 via the first technique because the balance of the burden on network usage and processor usage favors the first technique over the second technique, e.g., the burden on the example slower processor of first ZSC 210 can be greater than on the example faster processor of third ZSC 260, such as where third ZSC 260 can have a newer and faster processor than an older processor of first ZSC 210, etc., and the burden on network resources is comparatively low given the example underutilized network resources. As another example, scaling component 290 can determine that there is adequate network resources and that third ZSC 260 has a more burdened processor than second ZSC 240 and, accordingly, can instruct second ZSC 240 to copy chunks 230 and 221 to third ZSC 260 via the second technique because the balance of the burden on network usage and processor usage favors the second technique over the first technique, e.g., the burden on the example more burdened processor of third ZSC 260 can be greater than on the example less burdened processor of second ZSC 240, such as where third ZSC 260 can have a newer and faster processor that is already heavily utilized in contrast to an older processor of second ZSC 240 that may simply be idle, etc., and the burden on network resources is comparatively low given the example underutilized network resources. As a third example, scaling component 290 can determine that there is limited network resources and that third ZSC 260 has a less burdened processor than second ZSC 240 and, accordingly, can instruct second ZSC 240 to copy chunks 230 and 221 to third ZSC 260 via the second technique because the balance of the burden on network usage and processor usage favors the second technique over the first technique, e.g., the burden on the example less burdened processor of third ZSC 260 can be less than on the example more burdened processor of second ZSC 240, and the burden on network resources is comparatively high given the example underutilized network resources, thus favoring moving less data over the network by first combining the data even at the more burdened processor. Numerous other examples will be readily appreciated and all such examples are within the scope of the instant disclosure even where not recited explicitly for the sake of clarity and brevity.

Figure 3:
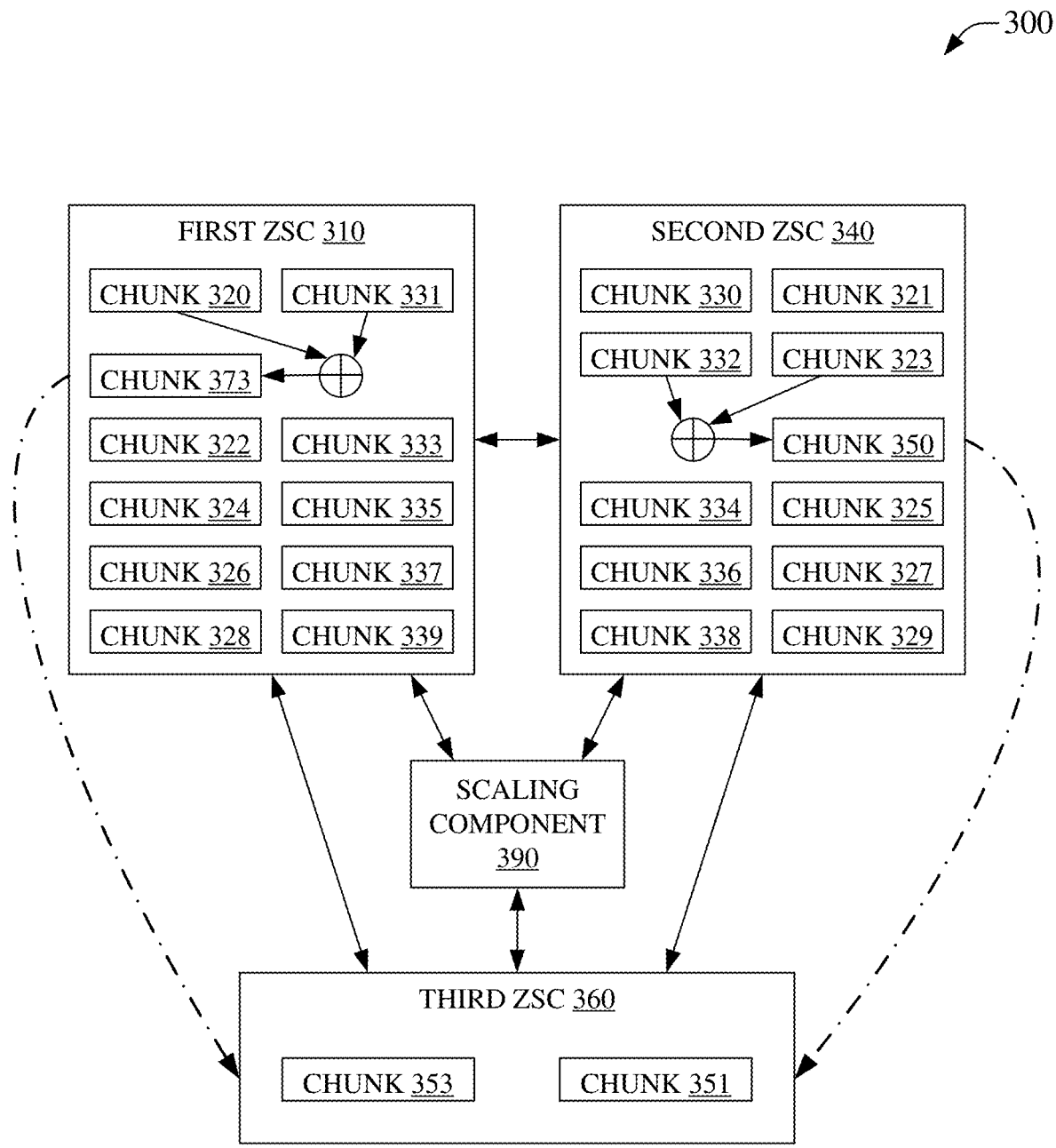
FIG. 3 is an illustration of an example system that can facilitate addition of a storage zone to geographically diverse storage zones employing multiple chunk compression processes, in accordance with aspects of the subject disclosure.

FIG. 3 is an illustration of a system 300, which can facilitate adapting an allocation of storage space for a storage zone of geographically diverse storage zones, in accordance with aspects of the subject disclosure. System 300 can comprise first ZSC 310. In some embodiments, first ZSC 310 can be similar to first ZSC 110, etc. In an embodiment, system 300 can comprise first ZSC 310, second ZSC 340, third ZSC 360, etc. The ZSCs can store data chunks, e.g., chunks 320-328, 330-338, 331-339, 321-329, etc. These chunks can be primary chunks, secondary chunks, etc. In an aspect, these chunks can be combined chunks, e.g., chunk 350, 373, etc. In an aspect, these chunks can be replicates of chunks. In an aspect, these chunks can be chunks comprising data representing data of other chunks or combined chunks having data representing other chunks.

Scaling component 390 can communicate with one or more of the ZSCs to orchestrate moving data between chunks of a geographically diverse storage system. In an embodiment, scaling component 390 can initiate copying chunks from a ZSC, e.g., first ZSC 310, etc., into another ZSC, e.g., third ZSC 360, etc. In an aspect, this can correspond to adding third ZSC 360 to a geographically diverse storage system comprising first ZSC 310, etc. As an example, where third ZSC 360 is added, scaling component 390 can determine that chunks 320 and 331 are to be moved into the newly added third ZSC 360. This determination can be based on criteria as disclosed elsewhere herein, e.g., cost, load balancing, network usage, reliability, geographic diversity, data redundancy, etc. In this example, chunk 353 can replicate information represented in chunks 320 and 331. Subsequently, chunks 320 and 331 can be deleted where their information is now represented in chunk 353. In some embodiments, network resource consumption can be improved by allowing an originating ZSC to first combine chunks prior to copying into a new ZSC. As an example, first ZSC 310 can copy chunks 320 and 331 into third ZSC 360 as chunk 353, second ZSC 340 can copy chunks 332 and 323 to third ZSC 360 as chunk 351, etc. The originating ZSCs, e.g., first ZSC 310, second ZSC 340, etc., can be instructed to, or can self-initiate, combining chunks before copying the resulting combined chunk into another ZSC, e.g., third ZSC 360, etc. System 300 illustrates, in an aspect, that some embodiments of the disclosed subject matter can apply the second technique of 'combine then move'. In an aspect, applying the second technique can reduce signaling between scaling component 390 and ZSCs, can allow ZSCs to automatically begin combining indicated chunks, etc. As such, a processor of scaling component 390 can be more dedicated to indicating which chunks should be moved and scheduling the moves, e.g., orchestrating chunk movement without the burden of dictating the first or second technique where the second technique is always applied.

In an aspect, the selection of chunks by scaling component 290 for movement between ZSCs can inherently consider the characteristics of the various components of system 300. As an example, the network loading can be considered when orchestrating chunk movements, e.g., scaling component 290 can determine that moving a combined chunk should occur at a particular period of expected adequate network resources. As another example, processor loading can be inherently considered, such as by allowing simultaneous copying of chunks, e.g., both chunk 373, representing data from chunks 320 and 331, and chunk 350, representing data from chunks 332 and 323, can be moved simultaneously where a processor of third ZSC 360 is determined to have adequate resources to facilitate the copying, e.g., as chunks 353 and 351. As illustrated, relying on the second technique of 'combine then move' for moving data can still be responsive to network resources, processor resources, etc., in a manner similar to that illustrated in system 200, but can reduce signaling associated with selecting either the first or second technique between scaling component 390 and one or more of the ZSCs of system 300.

Figure 4:
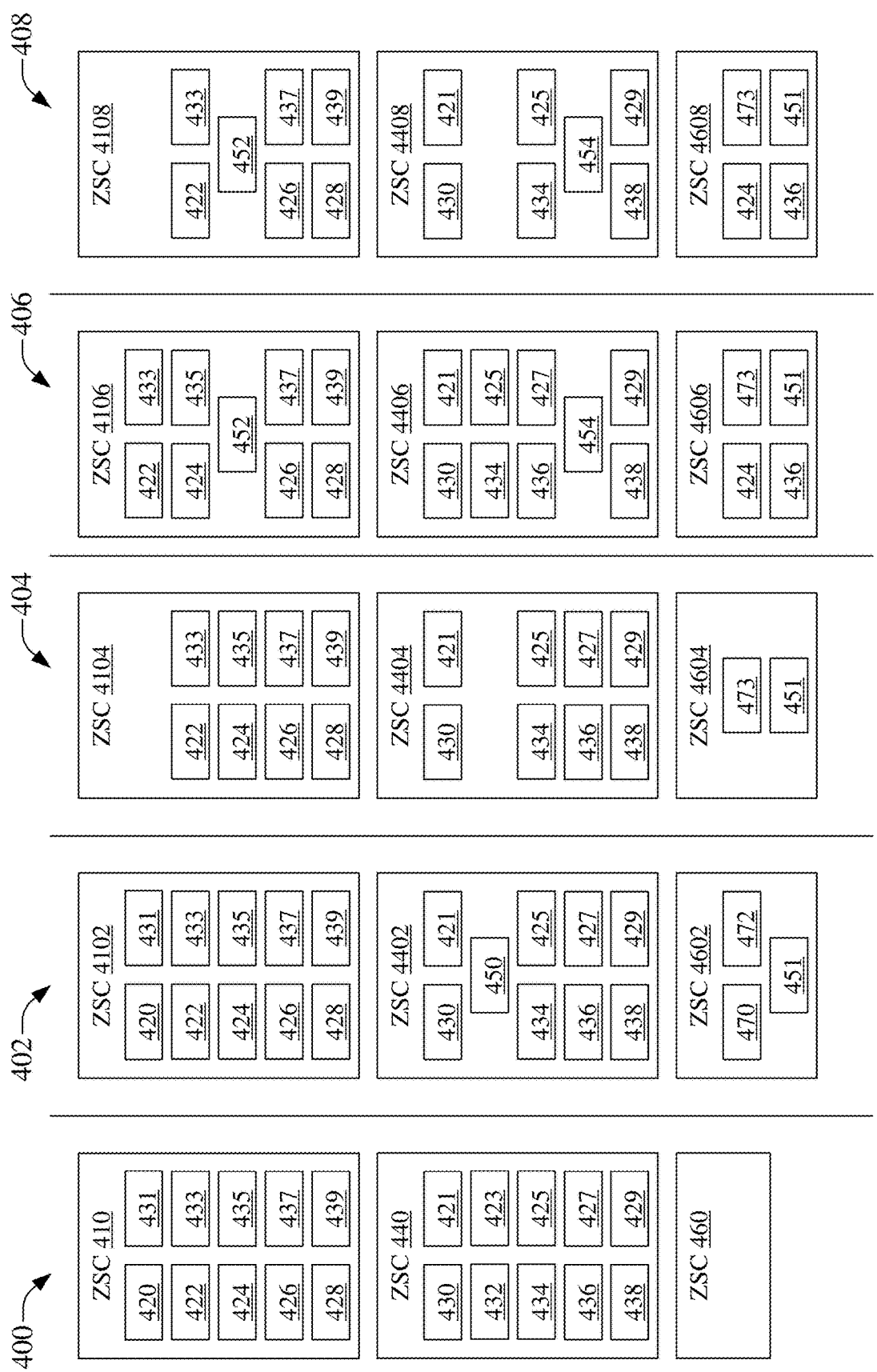
FIG. 4 is an illustration of example system states for addition of a storage zone to geographically diverse storage zones employing alternative chunk compression processes, in accordance with aspects of the subject disclosure.

FIG. 4 is an illustration of example system states, e.g., states 400-408, for addition of a storage zone to geographically diverse storage zones employing alternative chunk compression processes, in accordance with aspects of the subject disclosure. Example state 400 can illustrate ZSC 410 comprising stored data chunks 420-428, 431-439, etc. Example state 400 further illustrates ZSC 440 comprising stored data chunks 430-438, 421-429, etc. ZSC 460 can be newly added and is illustrated as not yet storing any data chunks. In an aspect, data chunks 420-428, 430-438, etc., can be primary data backup chunks, as disclosed elsewhere herein. In an aspect, data chunks 421-429, 431-439, etc., can be secondary data backup chunks of corresponding primary backup data chunks, also as disclosed elsewhere herein. As an example, data chunk 420 can be a primary chunk and chunk 421 can be a secondary chunk comprising data representing information of data chunk 420.

At state 402, ZSC 4102, ZSC 4402, and ZSC 4602 can respectively correspond to ZSC 410, ZSC 440, and ZSC 460 of state 400. ZSC 4102 can still comprise stored data chunks 420-428, 431-439, etc., ZSC 4402 can now comprise stored data chunks 430, 434-438, 421, 425-429, etc., and additionally can comprise chunk 450. In an embodiment, chunk 450 can be a combined chunk comprising data representing information comprised in chunks 432 and 423 from state 400. In an embodiment, once chunks 423 and 423 are combined into chunk 450, the source chunks, e.g., 432 and 423, can be deleted as their information is now represented in the combined chunk 450. In some embodiments, chunks 432 and 423 can be deleted at a later time, for example, after chunk 450 is copied into ZSC 4602, etc. State 402 also illustrates that chunks 420 and 431 have been copied into ZSC 4602 as chunks 470 and 472, which can be analogous to copying chunks 220 and 231 from first ZSC 210 into third ZSC 260 as chunks 270 and 272 in example system 200. Of note, chunks 420 and 431 can be retained ZSC 4102, as is illustrated, or can be deleted, not illustrated at this state, but see state 404. Further, state 402 illustrates that chunk 450, e.g., a convolution of chunks 432 and 423 for example, can be copied into ZSC 4602 as chunk 451, and, as such, chunk 451 can comprise data representative of the information originally comprised in chunks 432 and 423 from ZSC 440 at state 400.

Illustrated in state 404, ZSC 4104, ZSC 4404, and ZSC 4604 can respectively correspond to ZSC 4102, ZSC 4402, and ZSC 4602 of state 402. ZSC 4104 can comprise stored data chunks 422-428, 433-439, etc., ZSC 4402 can comprise stored data chunks 430, 434-438, 421, 425-429, etc. State 404 also illustrates that chunks 470 and 472 of ZSC 4602 can be combined into chunk 473, which can be analogous to combining chunks 270 and 272 into chunk 273 in example system 200. Chunks 470 and 472 are illustrated as having been deleted from ZSC 4604, however, in some embodiments, chunks 470 and/or 472 can be retained or deleted at a later time.

At state 406, ZSC 4106, ZSC 4406, and ZSC 4606 can respectively correspond to ZSC 4104, ZSC 4404, and ZSC 4604 of state 404. ZSC 4104 can comprise stored data chunks 422-428, 433-439, etc., ZSC 4402 can now comprise stored data chunks 430, 434-438, 421, 425-429, etc. Additionally, ZSC 4106 can comprise chunk 452 that can be a combination of chunks 424 and 435 and ZSC 4406 can comprise chunk 454 that can be a combination of chunks 436 and 427. In an aspect, the combined chunks 452 and 454 can be retained at ZSC 4106 and 4406 respectively, where a contributing chunk is moved to ZSC 4606. This can facilitate geographic diversity of stored chunks in accord with a geographically distributed storage system technology. Accordingly, chunks 424 and 436 can be replicated into ZSC 4606. In an embodiment, chunks 424, 435, 436, and 427 can then be deleted, although they are illustrated as still stored at ZSC 4106 and 4406 at state 406, but see state 408.

At state 408, ZSC 4108, ZSC 4408, and ZSC 4608 can respectively correspond to ZSC 4106, ZSC 4406, and ZSC 4606 of state 406. ZSC 4108 can comprise stored data chunks 422, 426-428, 433, 437-439, 452, etc., ZSC 4408 can now comprise stored data chunks 430, 434, 438, 421, 425, 429, 454, etc. Additionally, ZSC 4608 can comprise chunks 424, 436, etc., and combination chunks 473, 451, etc. In an embodiment, chunks 424, 435, 436, and 427 can then be deleted from ZSC 4106 and 4406 at state 406 respectively because their contents are replicated in combined chunks 452 and 454, which combined chunks can be deconvolved via chunks 422 and 436, respectively, stored at ZSC 4608. State 408 can therefore be regarded as represented an evolved form of ZSCs 410, 440, and 460 that has redistributed stored chunks in a manner that facilitates geographic diversity of stored chunks in accord with a geographically distributed storage system technology. A scaling component, e.g., scaling component 190, 290, 390, etc., can determine what chunks to move, combine, scheduling, etc., based on a variety of attributes associated with a geographically diverse storage system, as is disclosed herein. The states 400-408 can represent moving chunks by a combination of the disclosed first technique and the disclosed second technique, e.g., can be analogous, at least in part, to data movement shown in relation to system 200.

Figure 5:
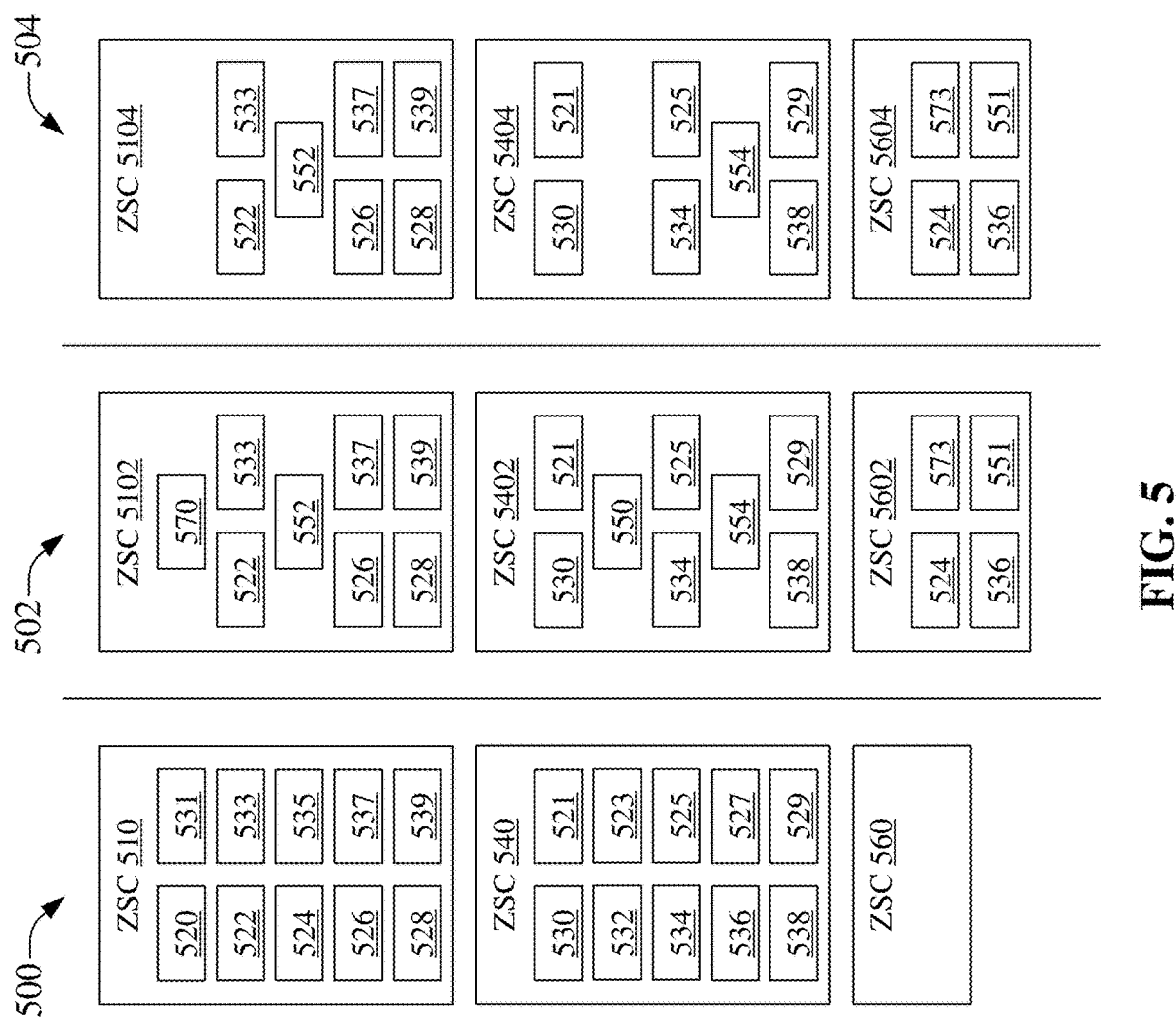
FIG. 5 is an illustration of example system states for addition of a storage zone to geographically diverse storage zones employing multiple chunk compression processes, in accordance with aspects of the subject disclosure.

FIG. 5 is an illustration of example system states, e.g., states 500-504, for addition of a storage zone to geographically diverse storage zones employing alternative chunk compression processes, in accordance with aspects of the subject disclosure. Example state 500 can illustrate ZSC 510 comprising stored data chunks 520-528, 531-539, etc. Example state 500 further illustrates ZSC 540 comprising stored data chunks 530-538, 521-529, etc. ZSC 560 can be newly added and is illustrated as not yet storing any data chunks. In an aspect, data chunks 520-528, 530-538, etc., can be primary data backup chunks, as disclosed elsewhere herein. In an aspect, data chunks 521-529, 531-539, etc., can be secondary data backup chunks of corresponding primary backup data chunks, also as disclosed elsewhere herein. As an example, data chunk 520 can be a primary chunk and chunk 521 can be a secondary chunk comprising data representing information of data chunk 520.

At state 502, ZSC 5102, ZSC 5402, and ZSC 5602 can respectively correspond to ZSC 510, ZSC 540, and ZSC 560 of state 500. ZSC 5102 can comprise stored data chunks 522, 526-528, 533, 537-539, 570, 552, etc. Chunk 570 can be a combined chunk comprising data representing the information comprised in chunks 520 and 531 of ZSC 510 at state 500. Chunk 552 can be a combined chunk comprising data representing the information comprised in chunks 524 and 535 of ZSC 510 at state 500. ZSC 5402 can comprise stored data chunks 530, 534, 538, 521, 525, 529, 550, 554, etc.

Chunk 550 can be a combined chunk comprising data representing the information comprised in chunks 532 and 523 of ZSC 540 at state 500. Chunk 554 can be a combined chunk comprising data representing the information comprised in chunks 536 and 527 of ZSC 540 at state 500. ZSC 5602 can comprise chunk 424, copied from ZSC 510 before chunk 424 was deleted therefrom, chunk 536, copied from ZSC 540 before being deleted therefrom, chunk 573 that can be a replicate of chunk 570, chunk 551 which can be a replicate of chunk 550, etc. Accordingly, information comprised in chunks 520-528, 531-539, 530-538, 521-529, etc., of state 500 remains preserved in state 502 but is distributed differently across ZSCs 510-560, etc.

At state 504, chunks 570 and 550 can be deleted as they are replicated in chunks 5730 and 551 of ZSC 5604. As such, ZSC 5104, which can correspond to ZSC 5102 of state 502, can comprise stored data chunks 522, 526-528, 533, 537-539, 552, etc., ZSC 5402, which can correspond to ZSC 5402 of state 502, can comprise stored data chunks 530, 534, 538, 521, 525, 529, 554, etc., and ZSC 5602 can comprise chunks 424, 536, combined chunks 573, 551, etc. As will be observed, state 504 mirrors previously disclosed state 408, but arrives at this state using 'combine then move' exclusively, to move either the combined chunk or one of the chunks contributing to the combined chunk to preserve a threshold level of geographic diversity and a threshold level of data redundancy. A scaling component, e.g., scaling component 190, 290, 390, etc., can determine, as is disclosed here, what chunks to move, combine, scheduling, etc., based on a variety of attributes associated with a geographically diverse storage system. The states 500-504 can represent moving chunks via the disclosed second technique, e.g., can be analogous, at least in part, to data movement shown in relation to system 300.

Figure 6:
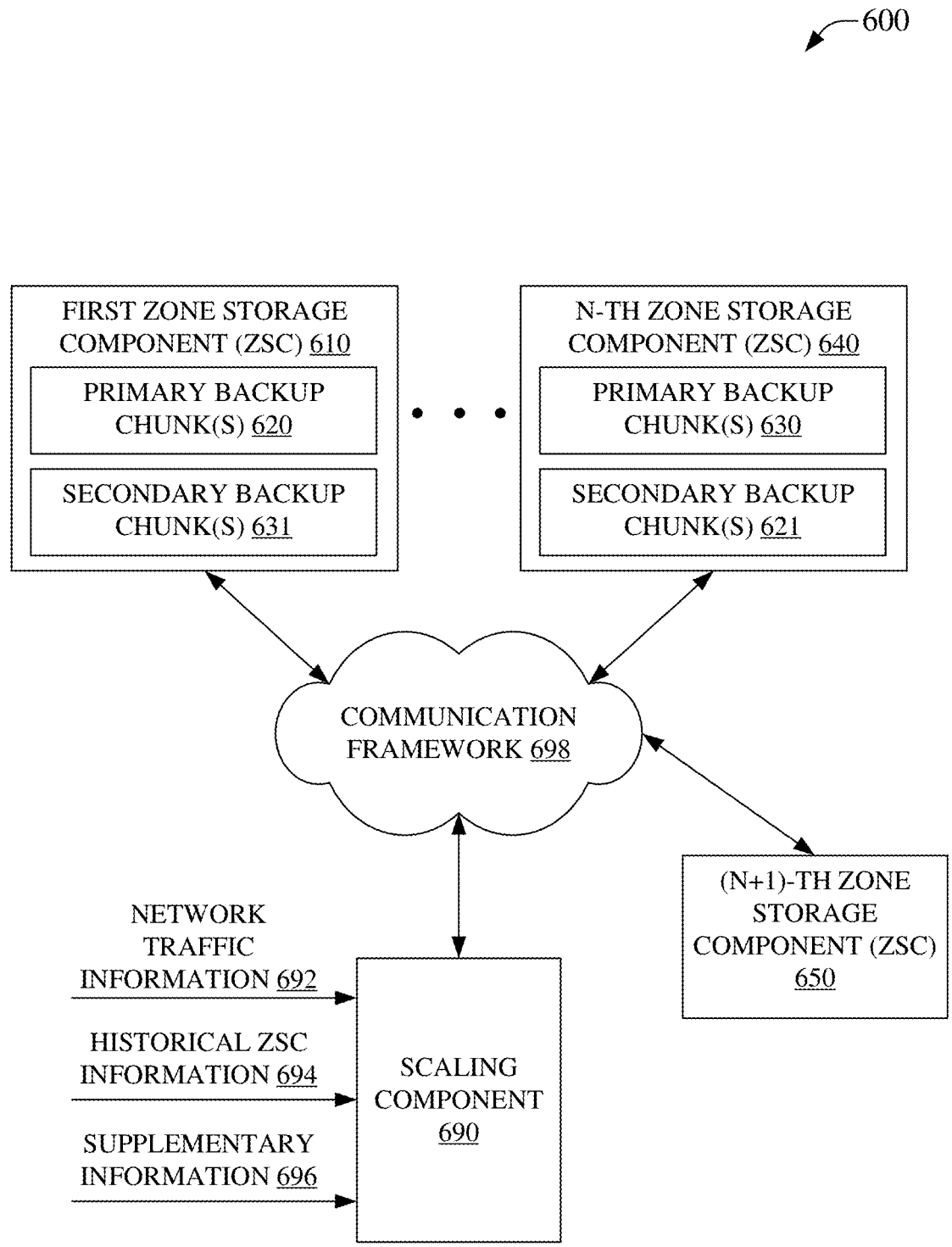
FIG. 6 is an illustration of an example system enabling addition of a storage zone to geographically diverse storage zones based on supplemental information, in accordance with aspects of the subject disclosure.

FIG. 6 is an illustration of a system 600, which can facilitate addition of a storage zone to geographically diverse storage zones based on supplemental information, in accordance with aspects of the subject disclosure. System 600 can comprise first ZSC 610 that can store data in accord with a geographically diverse storage construct. In an embodiment, ZSC 610 can store primary backup chunk(s) 620, secondary backup chunk(s) 631, etc. In an aspect, a primary data chunk can be a primary copy of data, e.g., a chunk of data of the same zone, a chunk of data from another zone, etc. In an aspect, the primary data chunk is itself a backup of customer data. A primary chunk can be backed up by a secondary data chunk that represents the data of the primary chunk. In an aspect, the secondary chunk can be stored on the same or different zone, although generally, for geographic diversity, the secondary chunk would typically be stored on another zone. As an example, secondary backup chunk(s) 631 can be secondary backups of primary backup chunk(s) 630 from N-th ZSC 640. As another example, secondary backup chunks(s) 621 of N-th ZSC 640 can be secondary backups of primary backup chunk(s) 620 from first ZSC 610. First ZSC 610 through N-th ZSC 640 can be communicatively coupled via communication framework 698, which can comprise, for example, a private network, a public network, a wireless network, a wired network, an optical network, a satellite network, etc. In an aspect, a new ZSC, e.g., (N+1)-th ZSC 650, hereinafter new ZSC 650, can be added to the geographically diverse storage construct and correspondingly can be communicatively coupled to other ZSCs, etc., via communication framework 698.

System 600 can comprise scaling component 690 that can be communicatively coupled to ZSCs, e.g., 610, 640, 650, etc., via communication framework 698. Scaling component can receive or access information related to the attributes of ZSCs, network conditions, etc., to aid in orchestrating moving, copying, distributing, redistributing, etc., data chunks, e.g., moving a primary or secondary data chunk from one or more of first ZSC 610 through N-th ZSC 640, to new ZSC 650, etc. In an aspect, scaling component 690 can select chunks, schedule actions related to the chunks, etc., to facilitate an orchestrated action pertaining to moving a chunk in accord with a geographically diverse storage system schema corresponding to a geographically diverse storage construct or system. As an example, a primary chunk of primary backup chunk(s) 620 can be selected by scaling component 690 based on a cost of storing data at first ZSC 610 being different than storing a copy of the chunk at new ZSC 650. Further, in this example, scaling component 690 can initiate copying of primary backup chunk(s) 620 from first ZSC 610 into new ZSC 650 and can additionally initiate deletion of primary backup chunk(s) 620 in response to determining that it has been successfully copied into new ZSC 650. In a second example, a primary chunk of primary backup chunk(s) 620 and a secondary chunk of secondary backup chunk(s) 631 can be selected by scaling component 690 based on an amount of available storage space at first ZSC 610. Scaling component 690 can then, in this example, initiate combining of the selected primary and secondary chunks into a combined chunk, initiate copying of the combined chunk from first ZSC 610 into new ZSC 650, and initiate deletion of the primary, the secondary, and the combined chunk in response to determining that the combined chunk has been successfully copied into new ZSC 650. Numerous other examples are readily apparent and all such examples are within the scope of the instant disclosure even where not recited explicitly for the sake of clarity and brevity.

In an embodiment, scaling component 690 can receive one or more of network traffic information 692, historical ZSC information 694, supplementary information 696, etc., which can be employed in determining chunk selection and chunk actions related to orchestrating distribution of chunks when scaling out a geographically diverse storage construct or system. In an embodiment, network traffic information 692 can comprise network traffic data related to communication framework. In an aspect, this data can be received from ZSCs or other components of the geographically distributed storage system, as is disclosed herein. In another aspect, network traffic information 692 can comprise information received from sources eternal to the geographically distributed storage system, e.g., from a network provider component, from historical records of network performance, from pricing models, etc. Network traffic information 692 can be employed in decision making by scaling component 690 based on current, historical, and/or predicted future network attributes, including inferences based on machine learning or other artificial intelligence. As an example, historical network data from an external source can be used to form an inference that network monetary costs per unit data transferred can be expected to be higher during a period and scaling component 690 can correspondingly select chunks for combining at a source ZSC to reduce the amount of data transferred, can schedule data movement in a different period to attempt to avoid the higher costs, etc.

Historical ZSC information 694 can comprise information related to historical use, performance, monetary and ancillary costs, data accessibility, etc., related to one or more ZSCs of the geographically distributed storage system. This historical information can be employed in determining chunk selection and chunk actions related to orchestrating distribution of chunks when scaling out a geographically diverse storage construct or system. As an example, historical ZSC information 694 can be indicate an increasing count of data access events for a ZSC. In an aspect, data access events can relate to events causing issues in accessing data chunks, such as, but not limited to, equipment failures, aging equipment speed/performance, natural disasters, network overloads, etc. Scaling component 690 can employ this information to select chunk(s) at a source ZSC to be redistributed to a new ZSC to in an attempt reduce difficulties in accessing data, e.g., moving data to a ZSC with newer/faster equipment, to a ZSC that is less prone to natural disasters, etc.

Scaling component 690 can further receive supplementary information 696 that can be nearly any type of information from nearly any source, and can employ supplementary information 696 in determining chunk selection and chunk actions related to orchestrating distribution of chunks when scaling out a geographically diverse storage construct or system. As an example, supplementary information 696 can be weather information that can indicate a vigorous hurricane season on the East coast of the United States, allowing scaling component 690 to rank less impacted ZSCs for movement of chunks in a scaling out of the geographically diverse storage system, e.g., an action related to moving chunks from a Miami ZSC to a new Kansas ZSC can be ranked, by scaling component 690 based on supplementary information 696, higher than an action moving data from a Texas ZSC to the new Kansas ZSC because Texas can be determined to be less likely to experience a hurricane related data access event than Miami during the example predicted bad storm season. In other examples, supplementary information 696 can comprise information related to rules/regulations, weather or other natural disaster events (eruptions, earthquake predictions, seismometer data, tornado predications, mudslide computations, etc.), international conflict data, etc. Numerous other examples of scaling component 690 coordinating data movement based on supplementary information 696 will be readily appreciated and are all considered within the scope of the instant disclosure even where not expressly recited for the sake of clarity and brevity.

Figure 7:
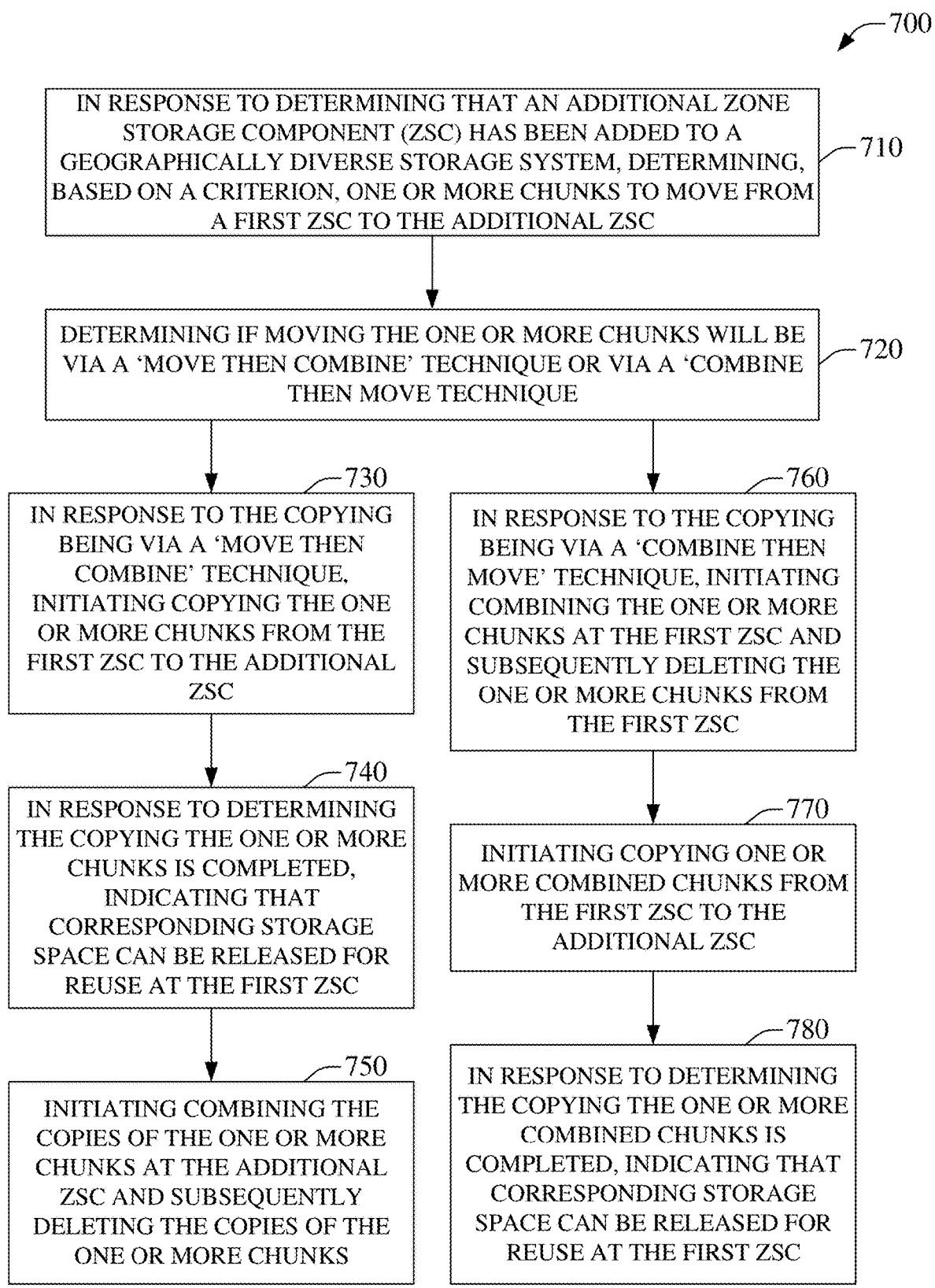
FIG. 7 is an illustration of an example method facilitating addition of a storage zone to geographically diverse storage zones of a geographically diverse storage construct, in accordance with aspects of the subject disclosure.

FIG. 7 is an illustration of an example method 700, which can facilitate addition of a storage zone to geographically diverse storage zones of a geographically diverse storage construct, in accordance with aspects of the subject disclosure. At 710, method 700 can comprise determining one or more chunks to move from a first ZSC to an additional ZSC that has been added to a geographically diverse storage system. The determining the one or more chunks can be based on a criterion, attribute, etc., e.g., monetary cost, energy consumption, space or size of the physical storage device(s), reliability of storage device(s), etc., as disclosed elsewhere herein. As an example, a criterion can be a threshold level of load balancing such that moving data from a first ZSC that can have storage space occupied by data chunks to a newly added ZSC that can have less storage space occupied by data chunks can serve to 'load balance', e.g., distribute chunks such that storage space is more even between the first ZSC and the newly added ZSC. Continuing this example, a second criterion can limit the number of chunks moved from the first ZSC to the newly added ZSC based on network usage associated with moving chunks, e.g., load balancing can be tempered by network usage. Similarly, the second criterion can be processor usage, e.g., load balancing can be tempered by processor usage, at the first ZSC, at the newly added ZSC, etc., associated with moving the chunk. Numerous other criteria can be employed in determining the one or more chunks to move, and all such criterion are within the scope of the instant disclosure even where not explicitly recited for the sake of clarity and brevity.

At 720, method 700 can comprise determining if moving the one or more chunks will be via a 'move then combine' or a 'combine then move' technique. Under a move then combine technique, such as is illustrated in a portion of system 200, etc., chunks to be moved can be copied to a destination ZSC, then the copies can be combined, convolved, etc., such as by an XOR operation, etc., to reduce consumed space associated with storing information represented in the copied chunks. The original chunks can then be deleted from the originating ZSC because the information they contained is now represented in the combined chunk at the destination ZSC. Under a combine then move technique, such as is also illustrated in a portion of system 200, etc., chunks to be moved can be combined before the resulting combined chunk is copied to a destination ZSC. The original chunks can then be deleted because the information they contained is now represented in the combined chunk. The combined chunk can then be copied to the destination ZSC. The combined chunk can reduce consumed space associated with storing information represented in the copied chunks and can therefore consume fewer network resources to copy to the destination ZSC than would be consumed by copying the original chunks. The combined chunk can then be deleted from the originating ZSC because the information contained therein is now represented in the copy of the combined chunk at the destination ZSC.

At 730, method 700 can comprise initiating copying of the one or more chunks from the first ZSC to the additional ZSC. The initiating the copying can be in response to the determining the copying is to be via the 'move then combine' technique from block 720. As such, the copying can be initiated to cause a copy of the chunks to be made at the additional ZSC without first combining the one or more chunks. In an aspect, this can be based on the criterion from block 710. As an example, where the criterion indicates that there is adequate network resources, processor resources, etc., copying the one or more chunks without first combining them can be performed. In this example, there may be no need to combine the chunks to save network or processor resources because, for example, combining the one or more chunks may not be needed, e.g., where the one or more chunks will not be combined at the additional ZSC under present conditions, etc. In another variation of this example, there may be no need to combine the chunks to save network or processor resources because use of the processor resources of the additional ZSC can be preferred over use of the processor resources of the first ZSC, etc. Accordingly, the one or more chunks can simply be copied from the first ZSC to the additional ZSC without first combining the one or more chunks. It is noted that combining the one or more chunks can comprise combining two or more of the one or more chunks, combining one or more of the one or more chunks with one or more other chunks, etc.

Method 700, at 740, can comprise indicating that the storage space of the first ZSC used to store the one or more chunks can be released in response to determining that the copying of the one or more chunks has been completed. In an embodiment, this can comprise indicating that the one or more chunks from the first ZSC can be deleted after they have been successfully copied to the additional ZSC. In other embodiments, this can comprise indicating that the storage space can be overwritten, indicating that the storage space be written into, etc.

At 750, method 700 can comprise initiating combining the copies of the one or more chunks at the additional ZSC. Further, upon determining that the copies have been combined into a combined chunk at the additional ZSC, it can be indicated that the space used to store the copies of the one or more chunks at the additional ZSC can be released, e.g., deleted, overwritten, etc. At this point method 700 can end. In an aspect, this leg of method 700 can move, e.g., via copying and delete operations, etc., the one or more chunks from the first ZSC to the additional ZSC based on the criterion, and can then combine the one or more chunks at the additional ZSC, for example, to conserve storage space at the additional ZSC.

Moving to 760, method 700 can advance from block 720, e.g., where it is determined that the moving of the one or more chunks will be via a 'combine then move' technique, and method 700 at 760 can comprise initiating combining of the one or more chunks at the first ZSC. Again, it is noted that combining the one or more chunks can comprise combining two or more of the one or more chunks, combining one or more of the one or more chunks with one or more other chunks, etc. Combining the one or more chunks can reduce the amount of storage space consumed to hold the information of the one or more chunks and, correspondingly can reduce the consumption of network and/or processor resources to move the combined chunk in comparison to the one or more chunks without combining them first. In an aspect, the combining the one or more chunks can result in one or more combined chunks. As an example, the one or more chunks can comprise Chunk A, Chunk B', Chunk C, etc., and these can be combined to form, for example, Chunk (A+B'), Chunk (C+D), etc. It is again noted that combining the one or more chunks can comprise combining two or more of the one or more chunks, combining one or more of the one or more chunks with one or more other chunks, etc.

At 770, method 700 can comprise initiating copying of the one or more combined chunks from the first ZSC to the additional ZSC. The initiating the copying can be in response to the determining the copying is to be via the 'combine then move' technique from block 720. As such, the copying can be initiated to cause a copy of a combined chunk to be made at the additional ZSC after generating the combined chunk based on the one or more chunks at the first ZSC. In an aspect, this can be based on the criterion from block 710. As an example, where the criterion indicates that there are limited network resources, processor resources, etc., combining the one or more chunks can reduce consumption of network resources associated with moving the one or more chunks to the additional ZSC, can reduce the consumption of processor resources at the additional ZSC, can reduce space consumed at the additional ZSC to store a representation of the information stored in the one or more chunks of the first ZSC, etc. In this example, it can be desirable to combine the one or more chunks to save network or processor resources because, for example, combining the one or more chunks can result in a combined chunk that, while still preserving the information of the one or more chunks, consumes less space than the one or more chunks and thus can consume less network resources to copy to a new zone as part of moving the chunks to the additional ZSC.

Method 700, at 780, can comprise indicating that the storage space of the first ZSC used to store the one or more combined chunks, which can represent the information of the one or more chunks, can be released in response to determining that the copying of the one or more combined chunks has been completed. At this point method 700 can end. In an embodiment, this can comprise indicating that the one or more combined chunks from the first ZSC can be deleted after they have been successfully copied to the additional ZSC. In other embodiments, this can comprise indicating that the storage space can be overwritten, indicating that the storage space be written into, etc.

Figure 8:
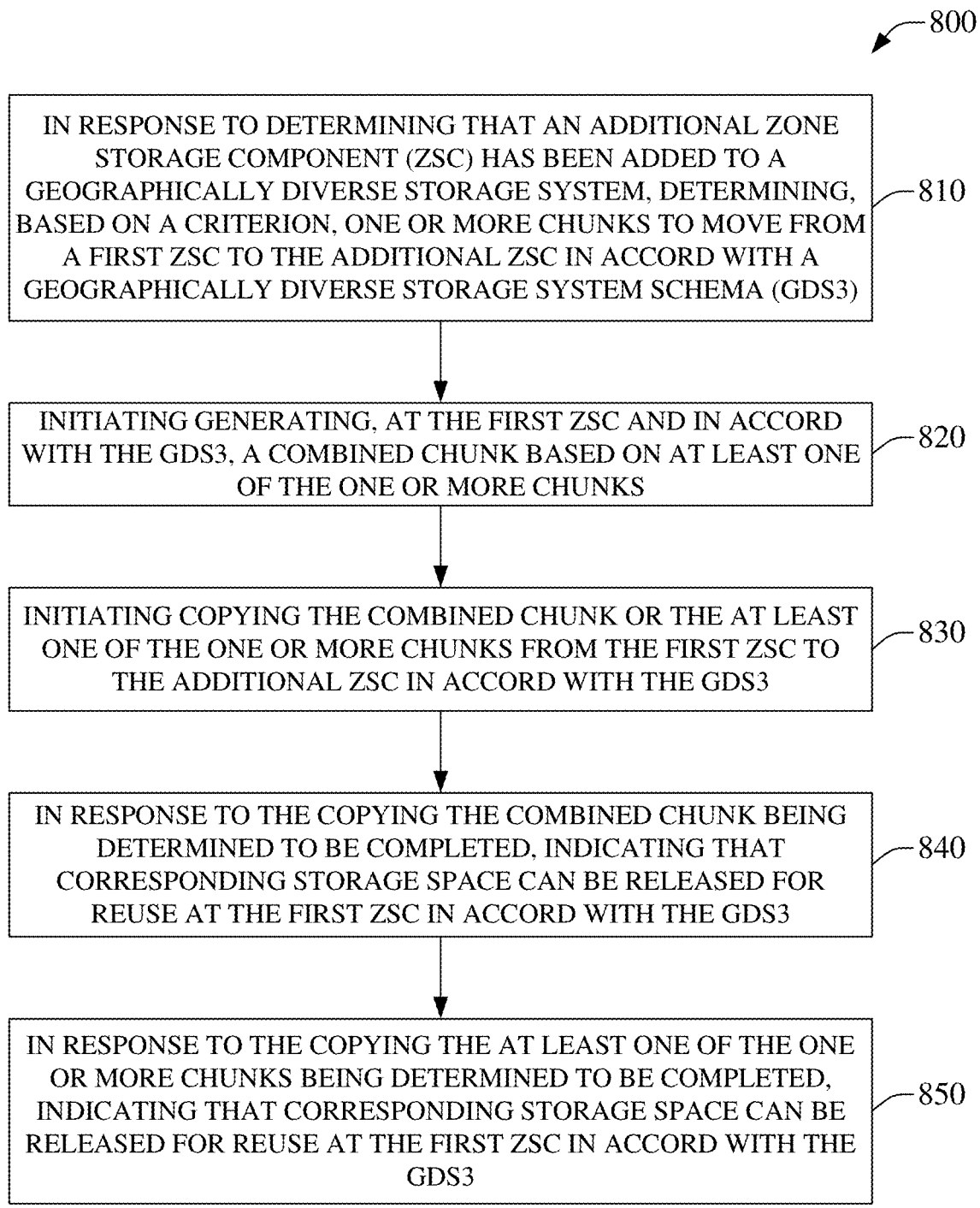
FIG. 8 illustrates an example method that enables addition of a storage zone to geographically diverse storage zones of a geographically diverse storage construct, in accordance with aspects of the subject disclosure.

FIG. 8 is an illustration of an example method 800, which can enable addition of a storage zone to geographically diverse storage zones of a geographically diverse storage construct, in accordance with aspects of the subject disclosure. At 810, method 800 can comprise determining one or more chunks to move from a first ZSC to an additional ZSC that has been added to a geographically diverse storage system. The determining the one or more chunks can be based on a criterion, attribute, etc., e.g., monetary cost, energy consumption, space or size of the physical storage device(s), reliability of storage device(s), etc., as disclosed elsewhere herein. In an aspect, the determining can be in accord with a geographically diverse storage system schema (GDS3). The GDS3 can dictate, for example, that a primary chunk and a secondary chunk backing up the same source chunk should not be stored on the same ZSC to provide geographic diversity to the redundant backup information. As an example, a primary chunk A can have a secondary chunk A' and these individual chunks, or chunks combined with them, should not be stored in the same zone, e.g., on the same ZSC, etc., to allow recovery of the data where one of the chunks becomes less accessible on a corresponding ZSC, such as storing Chunk A in a Seattle ZSC and Chunk A' on a Miami ZSC would allow recovery of Chunk A information from Seattle if the Miami copy, e.g., Chunk A', is lost in a severe storm, etc. Accordingly, method 800 can orchestrate chunk movement, e.g., via scaling component 190, 290, 390, 690, etc., such that chunks are moved, e.g., via copy and delete operations, etc., in a manner that is germane to the GDS3.

At 820, method 800 can comprise initiating generating, at the first ZSC, a combined chunk based on at least one of the one or more chunks. The combined chunk can be germane to the GDS3. Combining the one or more chunks can comprise combining two or more of the one or more chunks, combining one or more of the one or more chunks with one or more other chunks, etc. In an aspect, the combined chunk can consume less storage space than the contributing chunks of the one or more chunks. Accordingly, copying the combined chunk can similarly consume fewer network/processor resources than would be consumed by copying, e.g., as part of moving, the contributing chunks of the one or more chunks.

Method 800, at 830, can comprise initiating copying the combined chunk or the at least one of the one or more chunks from the first ZSC to the additional ZSC in accord with the GDS3. As an example, as is illustrated in states 500-504 of FIG. 5, the combined chunk, e.g., 570, etc., can be copied from ZSC 5102 to ZSC 5602 as combined chunk 573. As another example, also as is illustrated in states 500-504 of FIG. 5, the combined chunk, e.g., 552, etc., can be remain at ZSC 5102 but one of the contributing one or more chunks, e.g., one of chunk 524 or chunk 535, can be copied from ZSC 5102 to ZSC 5602, e.g., at 502, chunk 524, which contributes to combined chunk 552, can be copied from ZSC 510 to ZSC 5602. It is noted that keeping the combined chunk, e.g., chunk 552, at the first ZSC, e.g., ZSC 5102, and moving one of the contributing chunks, e.g., chunk 524, to the additional ZSC, e.g., ZSC 5602, can preserve a threshold level of geographic diversity in accord with GDS3. Of further note, the moved contributing chunk, e.g., chunk 524, can be used to recover data from the unmoved combined chunk, e.g., combined chunk 552, such as recovering data corresponding to chunk 535 from combined chunk 552 based on the copy of chunk 524 at ZSC 5602, in accord with the GDS3. Where a combined chunk is moved, such as where combined chunk 570 is copied to ZSC 5602 as combined chunk 573, a secondary chunk, e.g., chunk 521, that is a copy of a primary chunk, e.g., chunk 520, can be used to recover data for chunk 531 from combined chunk 573, again in accord with the GDS3.

At 840, method 800 can comprise indicating that the storage space of the first ZSC used to store the combined chunk can be released in response to determining that the copying of the combined chunk has been completed. In an embodiment, this can comprise indicating that the combined chunk from the first ZSC can be deleted after it has been successfully copied to the additional ZSC. In other embodiments, this can comprise indicating that the storage space can be overwritten, indicating that the storage space be written into, etc.

At 850, method 800 can comprise indicating that the storage space of the first ZSC used to store the one or more chunks can be released in response to determining that the copying of the one or more chunks has been completed. At this point method 800 can end. In an embodiment, this can comprise indicating that the one or more chunks from the first ZSC can be deleted after they have been successfully copied to the additional ZSC. In other embodiments, this can comprise indicating that the storage space can be overwritten, indicating that the storage space be written into, etc.

In an aspect, method 800 at 840 and 850 can be viewed as cleaning up extra redundant copies of data subsequent to the moving data, e.g., via copying, to the additional ZSC. In some embodiments, there can be reasons not to delete the extra redundant copies, for example, where the threshold level of redundancy is not met the extra redundant copies can be again copied into other ZSCs to achieve the threshold level of redundancy, etc.

In an aspect, method 800 can facilitate moving chunks as part of scaling up a geographically diverse storage system. The moving the chunks can be accomplished by copying chunks between zones and then deleting the extra redundant copies according to a GDS3. In an aspect, network, processor, or other resources can be conserved by first combining data prior to the copying and deleting operations. In a further aspect, the selection of chunks for moving between zones can be based on one or more criteria and be germane to the GDS3.

Figure 9:
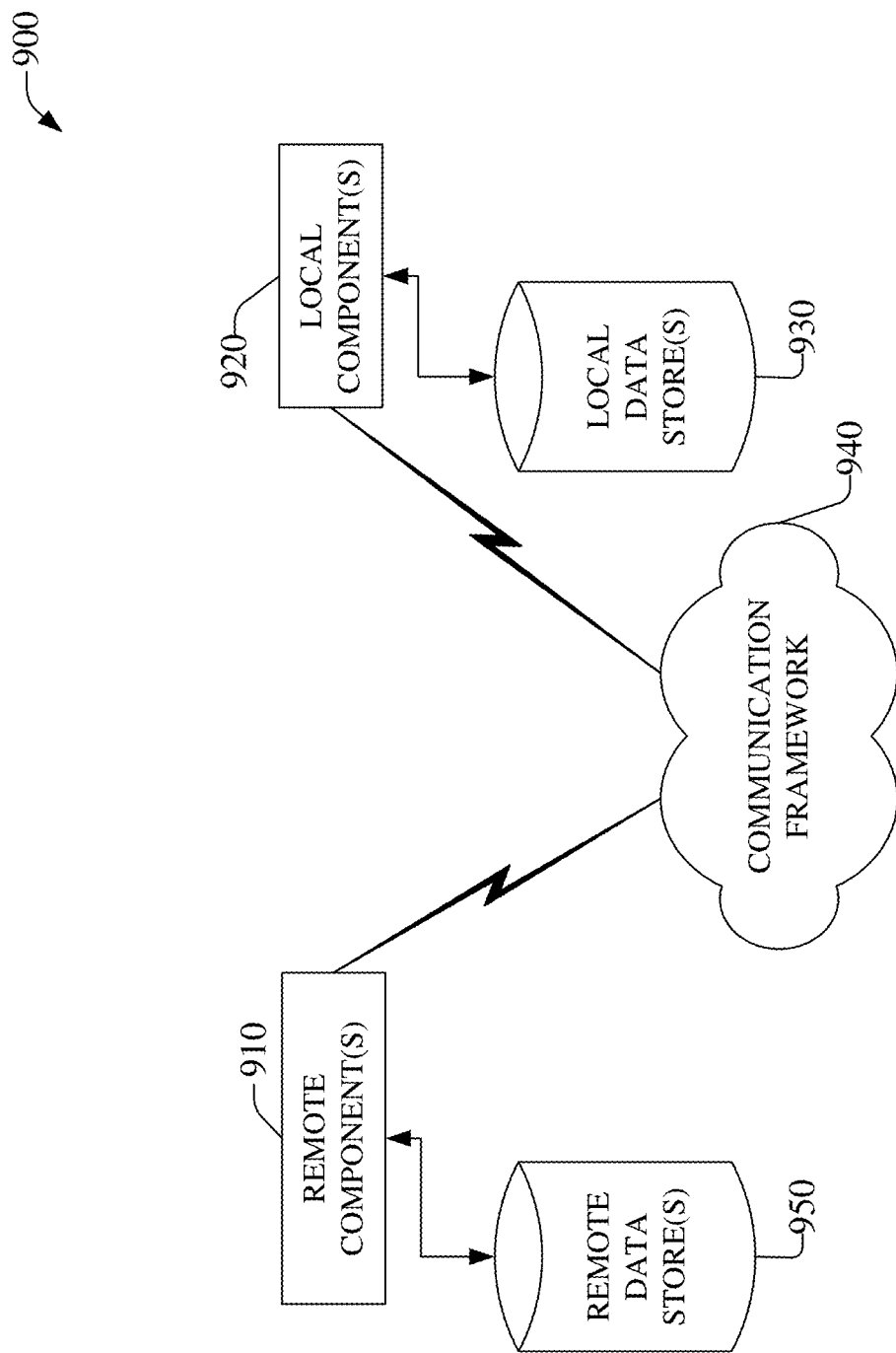
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 698, 940, etc. ZSC 110, 140, 160, 210, 240, 260, 310, 340, 360, 410, 4102, 4104, 4106, 4108, 510, 5102, 5104, 610, 640, 650, etc., can each be located remotely from other ZSCs, and thus can be regarded as remote component(s) 910 where located remotely from a local component, for example, another of the ZSCs from ZSC 110, 140, 160, 210, 240, 260, 310, 340, 360, 410, 4102, 4104, 4106, 4108, 510, 5102, 5104, 610, 640, 650, etc. Moreover, scaling component 190, 290, 390, 690, etc., can be located remotely from one or more of the ZSCs, e.g., ZSC 110, 140, 160, 210, 240, 260, 310, 340, 360, 410, 4102, 4104, 4106, 4108, 510, 5102, 5104, 610, 640, 650, etc. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via communication framework 940. In an aspect the remotely located ZSC or local ZSC can be embodied in ZSC 110, 140, 160, 210, 240, 260, 310, 340, 360, 410, 4102, 4104, 4106, 4108, 510, 5102, 5104, 610, 640, 650, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression, storage in partial or complete chunks, deletion of chunks, etc.

Figure 10:
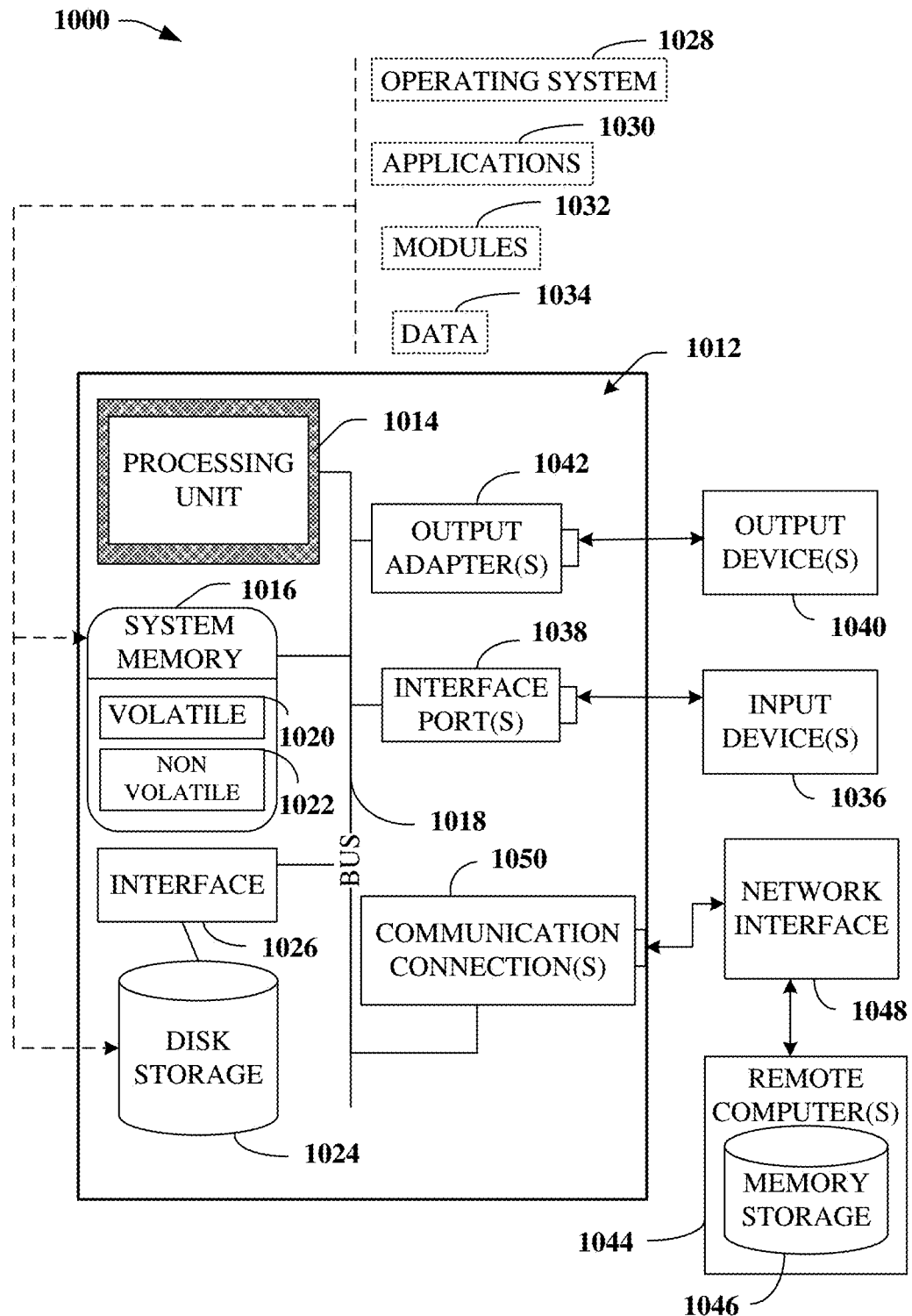
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC 110, 140, 160, 210, 240, 260, 310, 340, 360, 410, 4102, 4104, 4106, 4108, 510, 5102, 5104, 610, 640, 650, etc., or in other components, such as scaling component 190, 290, 390, 690, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining that a third zone storage component, e.g., ZSC 160, 260, etc., has been added to a geographically diverse storage system, and controlling copying of a representation of information comprised in a first chunk from a first zone storage component to the third zone storage component, wherein the copying is based on a criterion associated with the geographically diverse storage system, and wherein the copying is in accord with a geographically diverse storage system schema, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      determining that a second zone storage component has been added to a geographically diverse storage system comprising a first zone storage component;
      selecting a first chunk to move from the first zone storage component to the second zone storage component based on a criterion, wherein the first chunk is a first primary backup chunk, wherein the first zone further stores a second chunk that is a secondary backup chunk comprising a representation of information of a second primary backup chunk stored on a third zone storage component of the geographically diverse storage system, and wherein first contents of the first chunk and second contents of the second chunk are immutable;
      determining a moving technique for movement of the first chunk from the first zone storage component to the second zone storage component, wherein the moving technique is selected from a group of techniques comprising a 'combine then move' technique and a 'move then combine' technique, and wherein the determining the moving technique is based on a ranking of the moving technique corresponding to a computing resource usage criterion;
      in response to the moving technique being determined to be the 'combine then move' technique, combining the first chunk with the second chunk via an XOR operation such that the information comprised in the first chunk is represented in a resulting combined chunk, wherein third contents of the resulting combined chunk are immutable; and
      initiating moving the representation of information comprised in the first chunk, based on the moving technique, from the first zone storage component to the second zone storage component via a communication framework, wherein the moving is in accord with a geographically diverse storage system schema of the geographically diverse storage system.

2. The system of claim 1, wherein the second zone storage component is newly added to the geographically diverse storage system.

3. The system of claim 1, wherein the second zone storage component is an existing zone storage component of the geographically diverse storage system.

4. The system of claim 3, wherein the second zone storage component is in a dormant activity state.

5. The system of claim 1, wherein the criterion indicates inter-zone network resource usage.

6. The system of claim 1, wherein the criterion indicates processor resource usage of a processor of the first zone storage component.

7. The system of claim 1, wherein the criterion indicates processor resource usage of a processor of the second zone storage component.

8. The system of claim 1, wherein the initiating the moving of the representation of information comprised in the first chunk comprises initiating copying the resulting combined chunk from the first zone storage component to the second zone storage component.

9. The system of claim 8, wherein the operations further comprise, in response to determining that the resulting combined chunk has been copied from the first zone storage component to the second zone storage component, triggering a release of storage space of the first zone storage component used to store the first chunk, the second chunk, and the resulting combined chunk.

10. The system of claim 1, wherein the initiating the moving of the representation of information comprised in the first chunk comprises initiating copying the first chunk from the first zone storage component to the second zone storage component.

11. The system of claim 10, wherein the operations further comprise, in response to determining that the combined chunk has been copied from the first zone storage component to the second zone storage component, causing releasing of storage space of the first zone storage component used to store the first chunk and the second chunk.

12. A method, comprising:
   in response to determining, by a system comprising a processor and a memory, that a second zone storage component is comprised in a geographically diverse storage system comprising a first zone storage component, determining a first chunk to move from the first zone storage component to the second zone storage component based on a criterion related to resource consumption, wherein moving the first chunk accords with a moving technique selected from a group of techniques comprising a 'combine then move' technique and a 'move then combine' technique, wherein selection of the moving technique is based on a ranking of the moving technique corresponding to a computing resource usage criterion, and wherein first contents of the first chunk are immutable;
   causing, by the system, generation of a combined chunk via an XOR operation based on the first chunk and a second chunk, wherein second contents of the second chunk and third contents of the combined chunk are immutable, wherein the information comprised in the first chunk is represented in the combined chunk, wherein the first chunk is a first primary backup chunk, and wherein the first zone further stores a second chunk that is a secondary backup chunk comprising a representation of information of a second primary backup chunk stored on a third zone storage component of the geographically diverse storage system; and initiating, by the system, copying a representation of information comprised in the first chunk from the first zone storage component to the second zone storage component via a communication framework, wherein the copying is in accord with a geographically diverse storage system schema.

13. The method of claim 12, wherein the initiating the copying of the representation of information comprised in the first chunk comprises initiating copying the combined chunk from the first zone storage component to the second zone storage component and the method further comprises:

in response to determining that the combined chunk has been copied from the first zone storage component to the second zone storage component, indicating, by the system, a release of storage space of the first zone storage component used to store the first chunk, the second chunk, and the combined chunk.

14. The method of claim 12, wherein the initiating the copying of the representation of information comprised in the first chunk comprises initiating copying the first chunk from the first zone storage component to the second zone storage component, and the method further comprises:

in response to determining that the first chunk has been copied from the first zone storage component to the second zone storage component, indicating a release of storage space of the first zone storage component used to store the first chunk and the second chunk.

15. The method of claim 12, wherein the determining the second zone storage zone component is comprised in the geographically diverse storage system comprises determining that the second zone storage component is newly added to the geographically diverse storage system.

16. The method of claim 12, wherein the determining the first chunk to move is based on network resource consumption, first zone storage component processor resource consumption, or second zone storage component processor resource consumption.

17. A non-transitory machine-readable medium, comprising executable instructions that, when executed by a processor, facilitate performance of operations, comprising:

determining that a third zone storage component has been added to a geographically diverse storage system comprising at least a first zone storage component and a second zone storage component, wherein the first zone storage component comprises a first chunk that is a first primary backup chunk and a second chunk that is a secondary backup chunk of a second primary backup chunk stored on the second zone storage component, and wherein first contents of the first chunk and second contents of the second chunk are immutable; and controlling copying of a representation of information comprised in the first chunk from the first zone storage component to the third zone storage component, wherein the first chunk and the second chunk are combined into a combined chunk via an XOR operation, wherein third contents of the combined chunk are immutable, wherein the copying is performed via a communication network, wherein the copying is based on a criterion associated with the geographically diverse storage system, wherein copying accords with a moving technique selected from a group of techniques comprising a 'combine then move' technique and a 'move then combine' technique, wherein selection of the moving technique is based on a ranking of the moving technique corresponding to a computing resource usage criterion, and wherein the copying is in accord with a geographically diverse storage system schema.

18. The non-transitory machine-readable medium of claim 17, wherein the operations further comprise:

copying the combined chunk from the first zone storage component to the third zone storage component, wherein the information comprised in the first chunk is represented in the combined chunk; and in response to determining that the combined chunk has been copied from the first zone storage component to the third zone storage component, causing a release of storage space of the first zone storage component used to store the first chunk, the second chunk, and the combined chunk.

19. The non-transitory machine-readable medium of claim 17, wherein the operations further comprise:

copying the first chunk from the first zone storage component to the third zone storage component, wherein the information comprised in the first chunk is represented in the combined chunk; and in response to determining that the first chunk has been copied from the first zone storage component to the third zone storage component, causing a release of storage space of the first zone storage component used to store the first chunk and the second chunk.

20. The non-transitory machine-readable medium of claim 17, wherein:

the criterion indicates processor resource usage of a first processor of the first zone storage component, the criterion indicates processor resource usage of a second processor of the third zone storage component, or the criterion indicates network resource usage.

* * * * *